(12) United States Patent
Miyatake et al.

(10) Patent No.: US 6,504,687 B1
(45) Date of Patent: Jan. 7, 2003

(54) THIN-FILM MAGNETIC HEAD HAVING ABRASION-RESISTANT FACE OPPOSING RECORDING MEDIUM

(75) Inventors: Akira Miyatake, Niigata-ken (JP); Eiji Umetsu, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 191 days.

(21) Appl. No.: 09/660,928

(22) Filed: Sep. 13, 2000

(30) Foreign Application Priority Data

Sep. 17, 1999 (JP) .......................................... 11-264604

(51) Int. Cl.$^7$ ................................................. G11B 5/39
(52) U.S. Cl. ...................................................... 360/319
(58) Field of Search .................................. 360/319, 317

(56) References Cited

U.S. PATENT DOCUMENTS

| | | | | |
|---|---|---|---|---|
| 5,956,215 A | * | 9/1999 | Schmalhorst et al. | 360/113 |
| 6,177,207 B1 | * | 1/2001 | Koike | 428/692 |
| 6,292,334 B1 | * | 9/2001 | Koike et al. | 360/319 |
| 6,337,784 B2 | * | 1/2002 | Narumi et al. | 360/319 |

* cited by examiner

Primary Examiner—Jefferson Evans
(74) Attorney, Agent, or Firm—Brinks Hofer Gilson & Lione

(57) ABSTRACT

A thin-film magnetic head is provided, in which, even if sags occur in a shield layer when an opposing face opposing a medium is polished, the sags are unlikely to reach an MR device or another shield layer, whereby short-circuiting can be avoided. The thin-film magnetic head includes a laminate having a magnetoresistive device, two insulating layers provided on both sides of the magnetoresistive device in the thickness direction thereof, and two shield layers provided on the insulating layers on the magnetoresistive device, and a substrate on which the laminate is provided. In the thin-film magnetic head, the magnetoresistive device, the insulating layers, and the shield layers are exposed at the opposing face opposing a recording medium. At least one of the shield layers in contact with the insulating layers is composed of a magnetic layer and a rigid layer which is harder than the magnetic layer and is in contact with the insulating layer.

13 Claims, 12 Drawing Sheets

THIN-FILM MAGNETIC HEAD HAVING ABRASION-RESISTANT FACE OPPOSING RECORDING MEDIUM

BACKGROUND OF THE INVENTION

1. Field of the Invention

The present invention relates to thin-film magnetic heads, and more particularly, relates to a thin-film magnetic head having improved abrasion-resistance in a face opposing a recording medium.

2. Description of the Related Art

Since thin-film magnetic heads having magnetoresistive devices can better meet the need for the further narrowing of tracks compared with conventional bulk-type magnetic heads, thin-film magnetic heads in various forms have been applied to sliding-type magnetic heads which slide relative to a tape medium having high writing density and to floating-type magnetic heads which move relative to a magnetic disk without contacting therewith.

A sliding-type magnetic head having a conventional thin-film magnetic head will be described with reference to the figures.

FIG. 15 is a perspective view of a conventional sliding-type magnetic head, FIG. 16 is a plan view of a major portion of the sliding-type magnetic head observed from an opposing face opposing a recording medium side, and FIG. 17 is a cross-sectional view taken along the line XVII—XVII in FIG. 16.

A sliding-type magnetic head B shown in FIG. 15 is formed in an overall block shape, in which half-cores (substrates) 202 and 203 in the form of blocks are adhered to each other at side edge surfaces thereof with an in-core layer 5 therebetween. One side surface of a block formed of the half-cores 202 and 203 is fixed on a mounting plate 201 by adhesive so that a small portion of the block formed of the half-cores 202 and 203 protrudes out from the edge of the mounting plate 201.

One surface of the sliding-type magnetic head B protruding out from the mounting plate 201 is processed so as to have a curved convex shape, and the surface having the curved convex shape is used as a sliding face 206 sliding on a magnetic recording medium such as a magnetic tape.

As shown in FIGS. 16 and 17, a writing head (hereinafter referred as to an inductive head) 210 for writing and a thin-film magnetic head 211 for reading, provided with a magnetoresistive device, are embedded in the in-core layer 205.

The thin-film magnetic head 211 is composed of a lower shield layer 101, a lower insulating layer 104, a magnetoresistive device (hereinafter referred to as an MR device) 105, an upper insulating layer 106, and an upper shield layer 107, which are sequentially formed on the half-core 202.

As shown in FIG. 16, the edge faces of the lower shield layer 101, the lower insulating layer 104, the MR device 105, the upper insulating layer 106, and the upper shield layer 107 are exposed at the sliding face 206 sliding on a magnetic recording medium.

A reading magnetic gap G is formed by the lower insulating layer 104 and the upper insulating layer 106.

The upper shield layer 107 and the lower shield layer 101 are composed of, for example, a nickel-iron (NiFe) alloy; the upper shield layer 107 is formed by plating, and the lower shield layer 101 is formed by sputtering.

In addition, the upper insulating layer 106 and the lower insulating layer 104 are composed of, for example, $Al_2O_3$, and are formed by sputtering.

In the structure shown in FIGS. 16 and 17, the upper shield layer 107 is also used as a lower core layer for the inductive head 210 formed on the upper shield layer 107, a writing gap layer 110 is formed on the lower core layer (the upper shield layer) 107, a coil layer 111 patterned so as to be planar and spiral is formed on the writing gap layer 110, the coil layer 111 is surrounded with a coil insulating layer 112, and a front portion 113a of an upper core layer 113 formed on the coil insulating layer 112 opposes the lower core layer 107 at a minute distance therefrom with the writing gap layer 110 therebetween at the sliding face 206. A base portion side 113b of the upper core layer 113 is magnetically coupled with the lower core layer 107. In addition, a protective layer 116 is formed over the upper core layer 113. Numeral reference 108 in FIG. 17 indicates electrodes for detection connected to the MR device 105, and the electrodes 108 are connected to both sides of the MR device 105.

The sliding-type magnetic head B is produced by, for example, the steps as described below. The in-core layer 205 is first formed by sequentially forming the thin-film magnetic head 211 and the inductive head 210 by a thin-film formation technique on the half-core 202, and the other half-core 203 is then adhered to the in-core layer 205 so as to form the core block. Subsequently, one surface of the core block is polished by a polishing tape having a polishing powder composed of diamond or the like dispersed thereon so as to form the sliding face 206 having a curved convex shape, whereby the sliding-type magnetic head B is obtained.

However, in the sliding-type magnetic head B, since the upper and the lower shield layers 107 and 101, which sandwich the upper and lower insulating layers 106 and 104, are formed of a NiFe alloy having relatively low hardness, when the core block is polished by the polishing tape, the surfaces of the upper and the lower shield layers 107 and 101, which are polished, may be stretched, and as a result, sags D in the form of a tongue may be formed as shown in FIG. 16. In some cases, the sags D in the form of a tongue may extend from, for example, the upper shield layer 107 to the MR device 105 or the lower shield layer 101, and hence, there is a problems in that short-circuiting between the upper and the lower shield layers 107 and 101 and the MR device 105 may occur.

In addition, when the sliding-type magnetic head B slides relative to a magnetic tape or the like in order to read the magnetic writing information, the sliding face 206 of the head is actually polished by the magnetic tape, and in a manner similar to that described above, the shield layers 107 and 101 may be stretched so as to form the sags D.

Furthermore, recently, in order to respond to the need for higher magnetic writing density, the distance between the upper and the lower shield layers 107 and 101, i.e., the magnetic gap G, must be reduced. Accordingly, the upper and the lower insulating layers 106 and 104 tend to be thinner, and in this case, even when smaller sags are formed, the shield layers 107 and 101 are readily brought into contact with each other, whereby there is a problem in that short-circuiting is more likely to occur.

SUMMARY OF THE INVENTION

Taking the problems described above into consideration, an object of the present invention is to provide a thin-film magnetic head having a structure which prevents short-circuiting, in which, even if sags in a shield layer are formed when a sliding face sliding relative to a recording medium is polished, the sags do not reach an MR device or another shield layer.

To these ends, the present invention employs the following structure.

A thin-film magnetic head according to the present invention comprises a laminate comprising a magnetoresistive device for reading information by moving relative to a magnetic recording medium, insulating layers provided on both sides of the magnetoresistive device in the thickness direction thereof, and shield layers provided on each insulating layer, and a substrate on which the laminate is provided, in which the magnetoresistive device, the insulating layers, and the shield layers are exposed at an opposing face opposing a recording medium, wherein at least one of the shield layers in contact with the insulating layers comprises a magnetic layer and a rigid layer which is harder than the magnetic layer and is in contact with the insulating layer.

In the thin-film magnetic head described above, since at least one of the two shield layers with the magnetoresistive device provided therebetween is composed of a magnetic layer and a rigid layer, and since it is exposed at the opposing face opposing a recording medium, the rigid layer is not stretched in the form of a tongue due to relatively high hardness thereof even when the opposing face opposing a recording medium is polished, whereby the short-circuiting between the rigid layers or between the magnetoresistive device and the rigid layer will not occur.

In addition, even if the magnetic layer having relatively low hardness is stretched so as to form a sag in the form of a tongue when the opposing face opposing a recording medium is polished, since the rigid layer is disposed between the magnetic layer and the insulating layer, the sag is unlikely to reach the magnetoresistive device, and as a result, the probability of short-circuiting between the magnetoresistive device and the shield layer can be reduced.

In the thin-film magnetic head according to the present invention, at least one of the rigid layers may comprise a soft magnetic CoZrNb-based material.

According to the thin-film magnetic head mentioned above, since the rigid layer is composed of a soft magnetic CoZrNb-based material, and the rigid layer has both high hardness and soft magnetic properties, a shield layer which is able to prevent short-circuiting caused by sags, in addition to having superior shielding properties, can be formed.

In the thin-film magnetic head according to the present invention, at least one of the rigid layers may be a soft magnetic layer formed by sputtering.

In particular, the rigid layer is preferably composed of the same material as that of the magnetic layer.

In general, a layer formed by sputtering is a very dense layer and has high hardness.

Accordingly, since a soft magnetic layer formed by sputtering is used as a rigid layer, the rigid layer can provide high hardness, so that a shield layer having the ability to prevent short-circuiting caused by sags, in addition to having superior shielding properties, can be formed.

In the thin-film magnetic head according to the present invention, the rigid layer disposed further from the substrate than the magnetoresistive device may comprise a rigid base layer composed of a soft magnetic CoZrNb-based material in contact with the insulating layer and a rigid adhesive layer composed of the same material as that for the magnetic layer in contact therewith, and the rigid adhesive layer may be formed by sputtering.

According to the thin-film magnetic head mentioned above, since the rigid base layer is formed on the insulating layer, and since the rigid adhesive layer composed of the same material as that for the magnetic layer is formed between the rigid base layer and the magnetic layer by sputtering, separation between the rigid base layer and the magnetic layer can be prevented by the rigid adhesive layer.

That is, the rigid layer is formed by sputtering in order to increase hardness, and alternatively, the magnetic layer may be formed by plating in some cases.

In the case mentioned above, it is difficult for the rigid base layer and the magnetic layer to adhere to each other due to the difference in the film forming method, in addition to the difference in the material therebetween, and as a result, separation may occur in some cases.

Accordingly, when the rigid adhesive layer composed of the same material as that for the magnetic layer is formed between the rigid base layer and the magnetic layer by sputtering, the separation between the rigid base layer and the magnetic layer can be prevented since the rigid adhesive layer has superior adhesion to both rigid base layer and magnetic layer.

In the thin-film magnetic head of the present invention, the thickness of the rigid layer may be greater than the distance between the shield layers.

According to the thin-film magnetic head mentioned above, since the thickness of the rigid layer is set to be greater than the distance between the shield layers, and hence, the thickness of the rigid layer is greater than the magnetic gap length of the thin-film magnetic head, the distance between the magnetoresistive device and the individual magnetic layers can be sufficiently great, whereby the probability of short-circuiting between the shield layer and the magnetoresistive device can be significantly decreased even when sags in the magnetic layer occur.

In the thin-film magnetic head of the present invention, the CoZrNb-based material may be represented by the formula $Co_x Zr_y Nb_z$, in which the x, y, and z, representing the composition ratios on an atomic percent basis, are $78\% \leq x \leq 92\%$, $y=a(100-x)\%$, and $z=(100-x-y)\%$, and "a" is $0.1 \leq a \leq 0.5$.

According to the thin-film magnetic head described above, since the rigid layer is composed of the CoZrNb-based material having the composition described above, and the material having this composition has high hardness in addition to superior magnetic characteristics, a shield layer which can prevent short-circuiting caused by sags, in addition to having superior shielding properties, can be formed.

In the thin-film magnetic head of the present invention, the CoZrNb-based material may be represented by the formula $Co_x Zr_y Nb_z T_v$, in which the T is at least one element selected from the group consisting of gold (Au), palladium (Pd), chromium (Cr), rhodium (Rh), and ruthenium (Ru), the x, y, z, and v, representing the composition ratios on an atomic percent basis, are $78\% \leq x \leq 92\%$, $y=a(100-x)\%$, $0\% \leq v \leq 4\%$, and $z=(100-x-y-v)\%$, and "a" is $0.1 \leq a \leq 0.5$.

According to the thin-film magnetic head described above, since the CoZrNbT-based material containing an element T in the CoZrNb-based material is used, and the CoZrNbT-based material has superior corrosion resistance in addition to high hardness, a shield layer can be formed, which has superior shielding properties, ability to prevent short-circuiting caused by sags, and superior corrosion resistance.

In addition, instead of the CoZrNb-based material, a CoTaZr-based material represented by the formula $Co_aTa_bZr_c$ may be used, in which the a, b, and c, representing the composition ratios on an atomic percent basis, are $85\% \leq a \leq 95\%$, $2\% \leq b \leq 15\%$, and $2 \leq c \leq 10\%$.

In addition, instead of the CoZrNb-based material, a CoTaHf-based material represented by the formula $Co_s\text{-}Ta_tHf_u$ may be used, in which the s, t, and u, representing the composition ratios on an atomic percent basis, are $85\% \leq a \leq 95\%$, $2\% \leq t \leq 15\%$, and $2 \leq u \leq 10\%$.

DESCRIPTION OF THE PREFERRED EMBODIMENTS

Hereinafter, the embodiments of the present invention will be described with reference to the accompanying figures.

First Embodiment

A thin-film magnetic head according to the first embodiment of the present invention will be described with reference to the figures.

Figure 1:
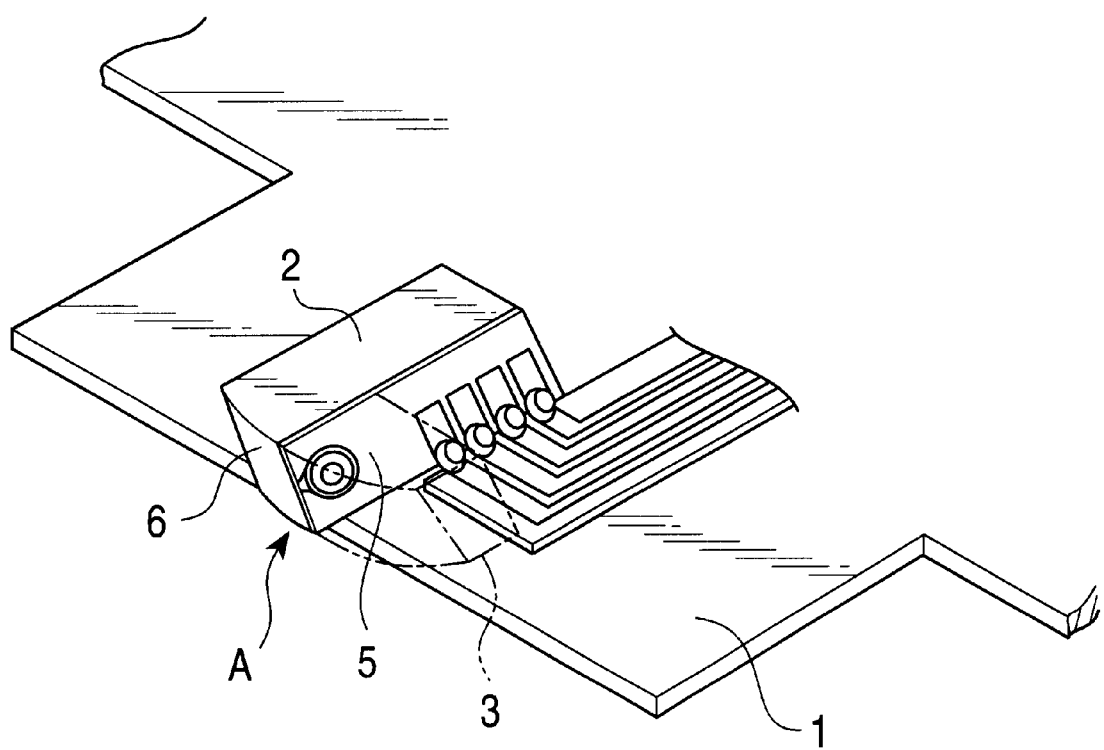
FIG. 1 is a perspective view of a sliding-type magnetic head provided with a thin-film magnetic head according to a first embodiment of the present invention.
Figure 2:
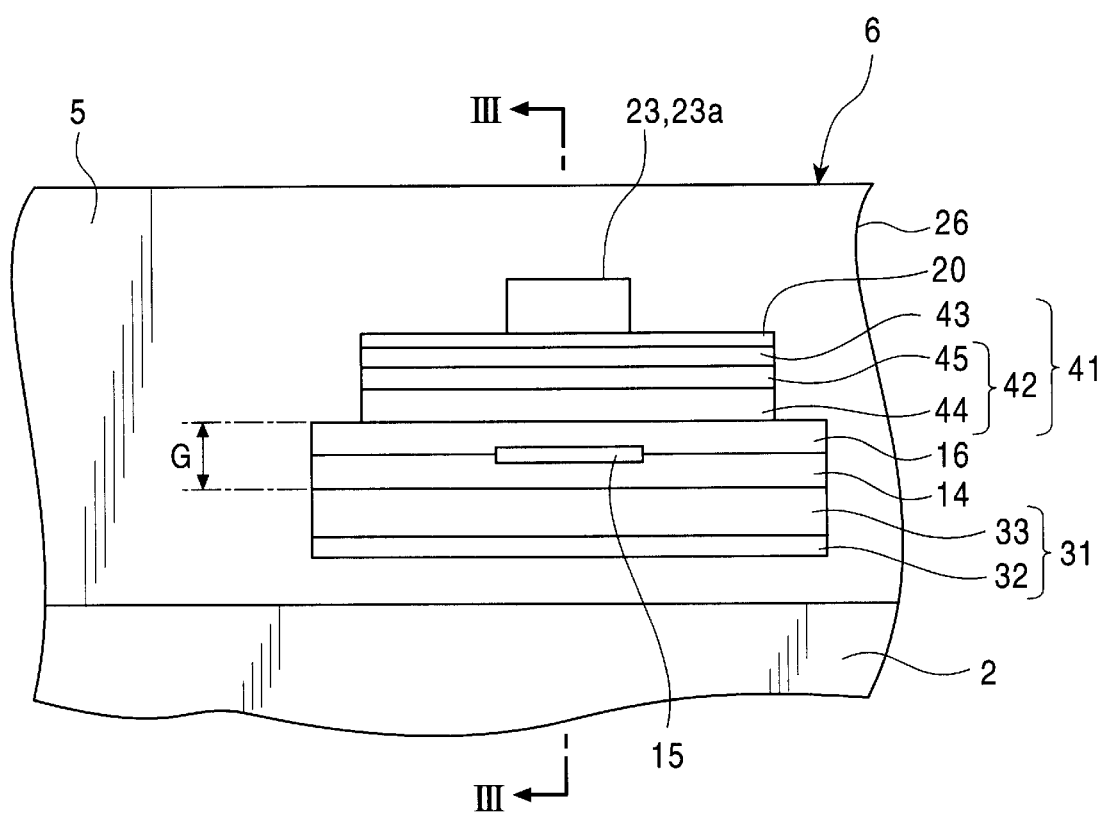
FIG. 2 is a plan view of a major portion of the sliding-type magnetic head in the FIG. 1 observed from an opposing face opposing a recording medium.
Figure 3:
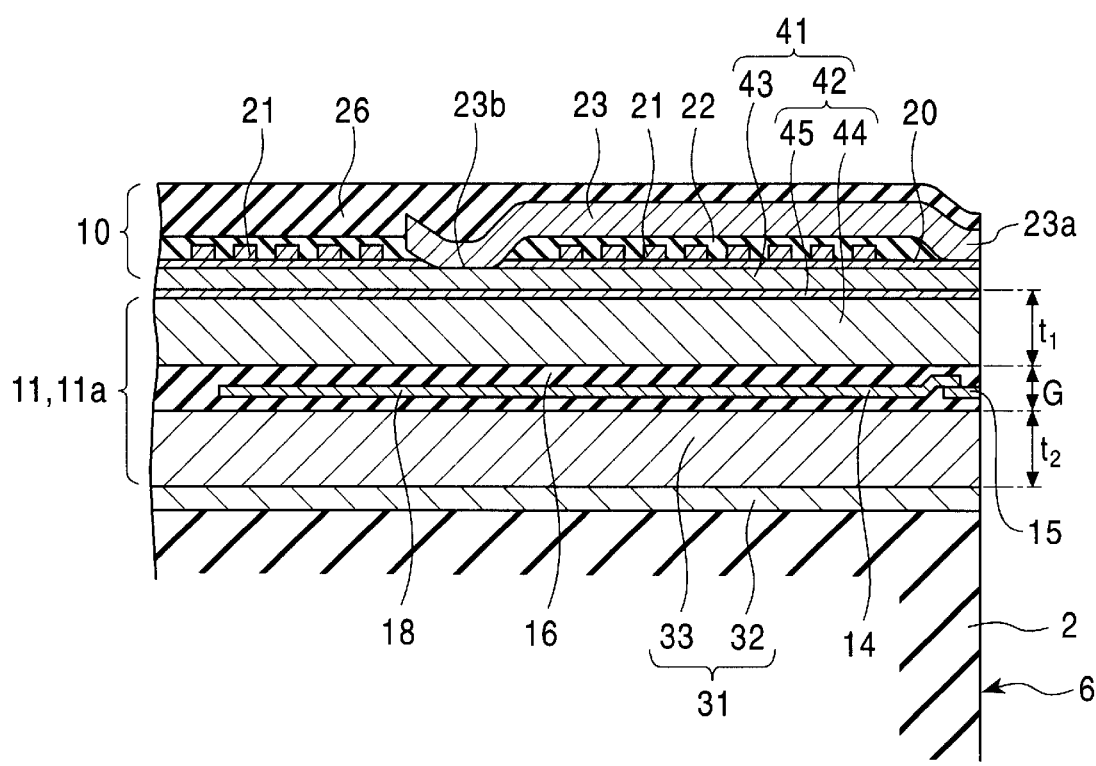
FIG. 3 is a cross-sectional view taken along the line III—III in FIG. 2.

FIG. 1 is a perspective view of a sliding-type magnetic head having the thin-film magnetic head of the present invention, FIG. 2 is a plan view showing a major portion of the sliding-type magnetic head observed from an opposing face opposing a medium, and FIG. 3 is a cross-sectional view of a major portion of the sliding-type magnetic head taken along the line III—III in FIG. 2.

A sliding-type magnetic head A shown in FIG. 1 is formed in an overall block shape, in which half-cores (substrates) 2 and 3 are adhered to each other at side edge surfaces thereof with an in-core layer 5 therebetween so as to be integrated. One side surface of the integrated half-cores 2 and 3 is fixed on a mounting plate 1 by adhesive so that a small portion of the integrated half-cores 2 and 3 protrudes out from the edge of the mounting plate 1.

One surface of the sliding-type magnetic head A protruding out from the mounting plate 1 is processed so as to have a curved convex shape, and the surface having the curved convex shape is used as an opposing face 6 opposing a magnetic recording medium such as a magnetic tape.

As shown in FIGS. 2 and 3, a writing head (hereinafter referred to as an inductive head) 10 for writing and a thin-film magnetic head 11 for reading provided with a magnetoresistive device are embedded in the in-core layer 5.

The thin-film magnetic head 11 is composed of a magnetoresistive device (hereinafter referred to as an MR device) 15, a lower insulating layer (an insulating layer) 14 and an upper insulating layer (an insulating layer) 16, which are composed of $Al_2O_3$ or the like, formed on both sides of the MR device 15 in the thickness direction thereof, and a lower shield layer (a shield layer) 31 and an upper shield layer (a shield layer) 41 formed on the lower insulating layer 14 and the upper insulating layer 16, respectively, so that the lower insulating layer 14 and the upper insulating layer 16 are sandwiched with the lower shield layer 31 and the upper shield layer 41.

The MR device 15, the lower insulating layer 14, the upper insulating layer 16, the lower shield layer 31, and the upper shield layer 41 form a composite slag, and the composite 11a is formed on the half-core 2. In addition, the layers 14, 16, 31, and 41, and the MR device 15 forming the composite 11a are exposed at the opposing face 6 opposing a recording medium.

Furthermore, a magnetic gap for reading is formed by the lower insulating layer 14 and the upper insulating layer 16, and the distance between the lower shield layer 31 and the upper shield layer 41 is set to be a gap length G.

In the structure shown in FIGS. 2 and 3, the upper shield layer 41 is also used as a lower core layer for the inductive head 10 formed on the upper shield layer 41, a writing gap layer 20 is formed on the lower core layer (the upper shield layer) 41, a coil layer 21 patterned so as to be planar and spiral is formed on the writing,gap layer 20, the coil layer 21 is surrounded with a coil insulating layer 22, and a front portion 23a of an upper core layer 23 formed on the coil insulating layer 22 opposes the lower core layer 41 at the opposing face 6 opposing a recording medium at a minute distance therefrom with the writing gap layer 20 therebetween. A base edge portion 23b of the upper core layer 23 is magnetically coupled with the lower core layer 41. In addition, a protective layer 26 is formed over the upper core layer 23. Reference numeral 18 in FIG. 3 indicates electrodes for detection connected to the MR device 15, and the electrodes 18 are connected to both sides of the MR device 15.

The upper shield layer (the shield layer) 41 is composed of an upper rigid layer (a rigid layer) 42 formed on the upper insulating layer 16 and an upper magnetic layer (a magnetic layer) 43 formed on the upper rigid layer 42.

The upper rigid layer 42 is composed of a rigid base layer 44 in contact with the upper insulating layer 16 and a rigid adhesive layer 45 formed on the rigid base layer 44. The rigid adhesive layer 45 is in contact with the upper magnetic layer 43 while being formed on the rigid base layer 44.

The upper magnetic layer 43 is composed of a soft magnetic material formed by plating, is preferably composed of a NiFe alloy, a NiCo alloy, a CoFe alloy, dr the like, and more preferably, is composed of a NiFe alloy.

The upper rigid layer 42 is harder than the upper magnetic layer 43, and the rigid base layer 44, forming the upper rigid layer 42 is composed of a cobalt-zirconium-niobium (CoZrNb) alloy having soft magnetic properties formed by sputtering. In addition, the rigid adhesive layer 45 is formed by sputtering and is composed of the same material as that for the upper magnetic layer 43.

Since the upper rigid layer 42 composed of the rigid base layer 44 and the rigid adhesive layer 45 is harder than the upper magnetic layer 43 and is disposed between the upper magnetic layer 43 and the upper insulating layer 16, the layers 44 and 45 are not stretched in the form of a tongue even when the opposing face 6 is polished, and hence, short-circuiting with the MR device 15 will not occur.

The rigid base layer 44 is formed by sputtering in order to increase the hardness thereof, and the upper magnetic layer 43 is formed by a common plating method. Accordingly, since the rigid base layer 44 and the upper magnetic layer 43 are formed by different film-formation methods and are composed of materials differing from each other, mutual adhesion of the layers is difficult, and as a result, separation between the rigid base layer 44 and the upper magnetic layer 43 may occur in some cases.

Consequently, when the rigid adhesive layer 45 composed of the same material as that for the upper magnetic layer 43 is formed by sputtering between the rigid base layer 44 and the upper magnetic layer 43, the separation between the rigid base layer 44 and the upper magnetic layer 43 can be prevented.

That is, the reasons for the above are that, since the rigid adhesive layer 45 is formed on the rigid base layer 44 by sputtering, the cohesion therebetween is improved, and since the rigid adhesive layer 45 and the upper magnetic layer 43 are composed of the same material, the cohesion therebetween is also improved.

The thickness $t_1$ of the upper rigid layer 42 is set to be greater than the total thickness of the upper insulating layer 16 and the lower insulating layer 14, i.e., the magnetic gap length G of the thin-film magnetic head 11. That is, the $t_1$ and the G are set so that $t_1 > G$.

As described above, since the thickness $t_1$ of the upper rigid layer 42 is set to be greater than the magnetic gap depth G, even when the upper magnetic layer 43 having relatively low hardness is stretched so as to form sags in the form of a tongue when the opposing face 6 is polished, the sags are unlikely to reach the MR device 15 or a lower rigid layer 33, and hence, the short-circuiting between the upper shield layer 41 and the MR device 15 will not occur.

In addition, a soft magnetic CoZrNb-based material forming the rigid base layer 44 has both soft magnetic properties and high hardness, so that the upper shield layer 41 can be formed, which can prevent short-circuiting caused by sags while having superior shielding properties.

The upper rigid layer 42 described above is a two-layer structure; however, the present invention is not limited thereto, and for example, a single layer comprised of a soft magnetic CoZrNb-based material may be used.

In the case mentioned above, since the upper rigid layer 42 also has both high hardness and soft magnetic properties, the upper shield layer 41 can be formed, which can prevent short-circuiting caused by sags while having superior shielding properties.

The upper rigid layer 42 described above may be composed of the same soft magnetic material as that used for the upper magnetic layer 43 formed by sputtering.

A layer formed by sputtering is a very dense layer and has high hardness. Accordingly, by using a soft magnetic layer formed by sputtering as the upper rigid layer 42, it is possible to make the upper rigid layer 42 have high hardness, and hence, the upper shield layer 41 can be formed, which can prevent short-circuiting caused by sags while having superior shielding properties.

The lower shield layer 31 is composed of a lower magnetic layer 32 formed on the half-core 2 and a lower rigid layer 33 formed on the lower magnetic layer 32. The lower rigid layer 33 is in contact with the lower insulating layer 14.

The lower magnetic layer 32 is composed of a soft magnetic material formed by sputtering, is preferably composed of a NiFe alloy, a NiCo alloy, a CoFe alloy, or the like, and more preferably, is composed of a NiFe alloy.

The lower rigid layer 33 is harder than the lower magnetic layer 32, is formed by sputtering, and is composed of a soft magnetic CoZrNb-based alloy.

In addition, the thickness $t_2$ of the lower rigid layer 33 is set to be greater than the magnetic gap length G. That is, the thickness t2 of the lower rigid layer 33 and the magnetic gap length G are set so that $t_2 > G$.

The lower rigid layer 33 is harder than the lower magnetic layer 32 and is disposed between the lower magnetic layer 32 and the lower insulating layer 14, so that the lower rigid layer 33 is not stretched in the form of a tongue when the opposing face 6 is polished, and hence, short-circuiting with the MR device 15 will not occur.

In addition, the thickness of the lower rigid layer 33 is set to be greater than that of the magnetic gap length G, even when the lower magnetic layer 32 having relatively low hardness is stretched so as to form sags in the form of a tongue when the opposing face 6 is polished, the sags are unlikely to reach the MR device 15, and hence, the short-circuiting between the lower shield layer 31 and the MR device 15 will not occur.

Since the rigid base layer 44 and the lower rigid layer 33 are required to have high hardness, high permeability, high saturation magnetization, negative coercive force and magnetostrictive constants which are nearly zero, and anisotropic magnetic fields having appropriate strength, the CoZrNb-based material described above may be considered as an example.

As suitable materials among the CoZrNb-based materials, soft magnetic alloys having an amorphous phase as a major phase, represented by the formula shown below, may be mentioned. That is, the soft magnetic alloys are represented by the formula $Co_x Zr_y Nb_z$, in which the x, y, and z, representing composition ratios on an atomic percent basis, are $78\% \leq x \leq 92\%$, $y=a(100-x)\%$, and $z=(100x-y)$, and "a" is $0.1 \leq a \leq 0.5$.

Co is an element having magnetic properties, and the composition ratio x thereof is preferably 78 to 92 atomic percent. When the composition ratio x of the Co is in the range mentioned above, the saturation magnetization, the permeability, and the resistivity can be increased, and the magnetostrictive constant can be nearly zero.

Since Zr increases the magnetostrictive constant and in addition improves corrosion resistance, the magnetostrictive constant of CoZrNb-based materials can be controlled by adjusting the content of Zr. However, when the composition ratio y of the Zr is significantly high, the saturation magnetization may be decreased. Accordingly, the composition ratio y of the Zr is preferably 0.1(100-x) to 0.5(100-x) atomic percent.

In addition, when Ta and/or Nb is added, the ability to form an amorphous structure in the CoZrNb-based material can be enhanced, and the advantage of decreasing the magnetostrictive constant can be obtained. In particular, it is preferable that Nb be added since soft magnetic properties can be readily obtained.

In addition to the CoZrNb-based materials described above, soft magnetic alloys having an amorphous phase as a major phase represented by the formula shown below may be used. That is, the soft magnetic alloys are represented by the formula $Co_xZr_yNb_zT_v$, in which T is at least one element selected from the group consisting of Au, Pd, Cr, Rh, and Ru, and the x, y, z, and v, representing composition ratios on an atomic percent basis, are $78\% \leq x \leq 92\%$, $y=a(100-x)\%$, $0\% \leq v \leq 4\%$, and $z=(100-x-y-v)$, respectively, and "a" is $0.1 \leq a \leq 0.5$.

When Nb and Zr are added to Co, hardness and soft magnetic properties are improved, and corrosion resistance is also improved. In particular, when the thin-film magnetic is applied to a sliding-type magnetic head, the corrosion resistance of the CoZrNb-based material must be improved. In order to improve corrosion resistance, it is preferable to add at least one element T selected from the group consisting of Au, Pd, Cr, Rh, and Ru.

Since the CoZrNb-based material containing the element T represented by the formula described above has high hardness, high permeability and saturation magnetization, low coercive force and magnetostrictive constant, anisotropic magnetic field having appropriate strength, and further improved corrosion resistance, the CoZrNb-based materials described above can be suitably used as materials forming the shield layers 31 and 41.

Co is an element having magnetic properties, and similar to the composition ratio mentioned above, the composition ratio thereof is preferably 78 to 92 atomic percent. When the composition ratio of the do is in the range mentioned above, the saturation magnetization, the permeability, and the resistivity can be increased, and the magnetostrictive constant can be nearly zero.

Since Zr increases magnetostrictive constant and in addition improves corrosion resistance, the magnetostrictive constant of CoZrNb-based materials can be controlled by adjusting the content of Zr. However, when the composition ratio y of the Zr is significantly high, the saturation magnetization may be decreased. Accordingly, the composition ratio y of the Zr is preferably 0.1(100-x) to 0.5(100-x) atomic percent.

In addition, when Ta and/or Nb is added, the ability to form an amorphous structure in the CoZrNb-based material can be enhanced, and the advantage of decreasing the magnetostrictive constant can be obtained. In particular, it is preferable that Nb be added since soft magnetic properties can be readily obtained.

When the element T is added, the corrosion resistance of the CoZrNb-based material can be improved, and in addition, the magnetostrictive constant can be controlled.

The composition ratio of the element T is preferably 0 to 4 atomic percent. It is not preferable that the content of the element T be more than 4 atomic percent since the saturation magnetization is decreased, and in addition, the magnetostrictive constant is significantly decreased.

Concerning Au among the element T's, the corrosion resistance of the CoZrNb-based material itself can be significantly improved by adding a small amount of Au. When Au is used as the element T, the composition-ratio thereof is preferably 0 to 2 atomic percent, and more preferably, 0.5 to 1.5 atomic percent. It is not preferable that the content of Au be more than 2 atomic percent since the magnetic properties are decreased. When the content of Au is set to be 0.5 to 1.5 atomic percent, the corrosion resistance can be further improved.

When Pd is added, the corrosion resistance can be improved, and in addition, the magnetostrictive constant can be decreased. Accordingly, in particular, in the case in which the corrosion resistance of the CoZrNb based material is improved by increasing the content of Zr, the magnetostrictive constant can be controlled at an appropriate value by adding an adequate amount of Pd.

When Pd is used as the element T, the composition ratio thereof is preferably 0 to 4 atomic percent, and more preferably, 1 to 3 atomic percent. It is not preferable that the content of Pd be more than 4 atomic percent since the magnetostrictive constant is significantly decreased. When the content of Pd is 1 to 3 atomic percent, the corrosion resistance can be further improved.

When Au, Pt, or Pd among the element T's is added, a decrease in permeability in a high frequency region can be suppressed. On the other hand, when Rh or Cr is added, hardness of the CoZrNb-based material can be further increased.

The sliding-type magnetic head A having the thin-film magnetic head of the present invention can be produced, for example, as described below.

First, the thin-film magnetic head 11 and the inductive head 10 are sequentially formed on the half-core 2 by using a thin-film formation technique, so that the in-core layer 5 is formed.

The in-core layer 5 is produced as described below. First, the lower magnetic layer 32 and the lower rigid layer 33 are sequentially formed on the half-core 2 by sputtering, so that the lower shield layer 31 is formed. Next, the lower insulating layer 14 is formed on the lower shield layer 31 by sputtering.

Subsequently, the MR device 15 and the electrodes 18 are formed on the lower insulating layer 14, and the upper insulating layer 16 covering the MR device 15 and the electrodes 18 is formed by sputtering.

The rigid base layer 44 and the rigid adhesive layer 45 are sequentially formed by sputtering so as to form the upper rigid layer 42, and the upper magnetic layer 43 is then formed thereon by plating, whereby the upper shield layer 41 is formed.

As described above, the thin-film magnetic head 11 of the present invention is produced.

On the shield layer 41, the writing gap head 20, the coil layer 21, the coil insulating layer 22, and the upper core layer 23 are sequentially formed, whereby the inductive head 10 is produced.

Subsequently, the protective layer 26 is formed so as to cover the thin-film magnetic head 11 and the inductive head 10, whereby the in-core layer 5 is produced.

In addition, the in-core layer 5 is integrated with the other half-core 3 so as to form a core block. One surface of the core block is then polished with a polishing tape including, for example, diamond particles dispersed therein to form the opposing face 6 opposing a recording medium having a curved concave shape as shown in FIG. 1, whereby the sliding-type magnetic head A is obtained.

In the thin-film magnetic head 11 described above, since the upper shield layer 41 is composed of the magnetic layer 43 and the rigid layer 42, and since the lower shield layer 31 is composed of the magnetic layer 32 and the rigid layer 33, which shield layers sandwich the MR device 15 and the upper and the lower insulating layers 16 and 14, even when the opposing face 6 is polished, the rigid layers 42 and 33 are not stretched in the form of a tongue due to the relatively high hardness thereof. Accordingly, the short-circuiting between the rigid layers 42 and 33 or between the MR device 15 and the rigid layer 42 and/or the rigid layer 33 will not occur.

In addition, when the opposing face 6 is polished, even if the upper magnetic layer 43 and/or the lower magnetic layer 32 is stretched so as to form sags in the form of a tongue, since the rigid layers 42 and 33 are disposed between the magnetic layer 43 and the insulating layer 16 and between the magnetic layer 32 and the insulating layer 14, respectively, the sags are unlikely to reach the MR device 15, and hence, the probability of short-circuiting of the MR device 15 with the shield layer 41 and/or the shield layer 31 can be decreased.

Second Embodiment

Figure 4:
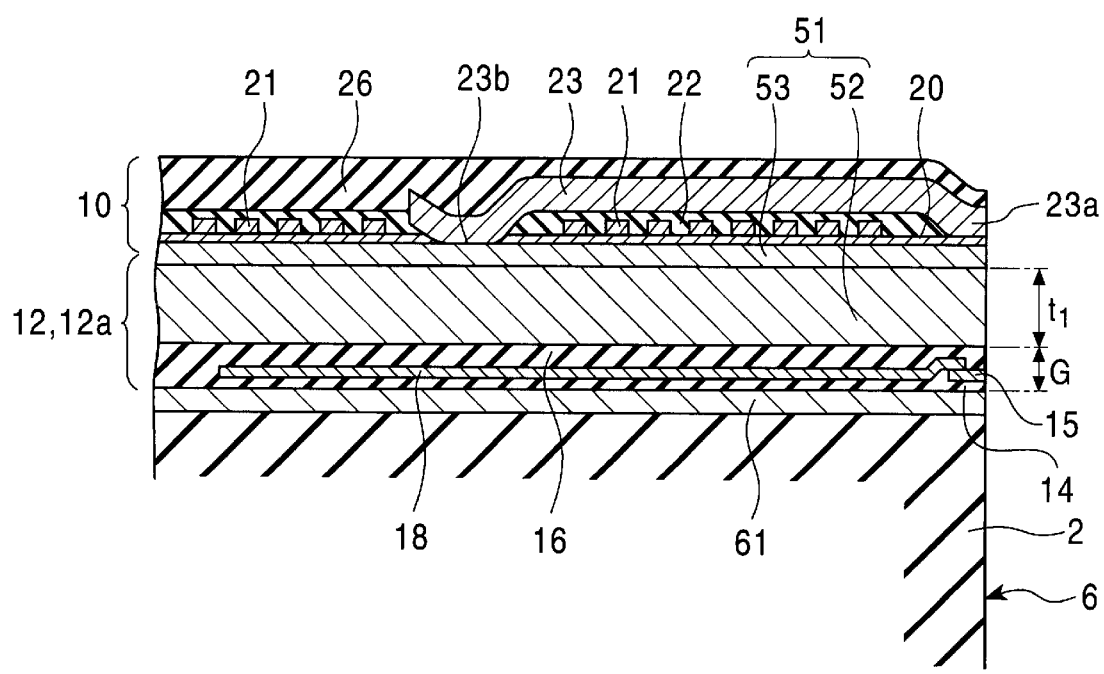
FIG. 4 is a cross-sectional view of a major portion of a thin-film magnetic head according to a second embodiment of the present invention.

Next, the second embodiment of the present invention will be described with reference to the accompanying figures. FIG. 4 is a cross-sectional view of a major portion of a thin-film magnetic head according to the second embodiment of the present invention. Among constituent elements shown in FIG. 4, the same reference numbers of constituent elements in FIGS. 1 to 3 designate the same constituent elements in FIG. 4, and descriptions thereof will be omitted or will be brief.

A thin-film magnetic head 12 according to the second embodiment, similar to the thin-film magnetic head 11 in the first embodiment, is embedded together with an inductive head 10 in an in-core layer 5 and is disposed between half-cores 2 and 3.

The thin-film magnetic head 12 is composed of an MR device 15, a lower insulating layer 14 and an upper insulating layer 16, which are composed of $Al_2O_3$ or the like, formed on both sides of the MR device 15 in the thickness direction thereof, and a lower shield layer (a shield layer) 61 and an upper shield layer (a shield layer) 51 formed on the lower insulating layer 14 and the upper insulating layer 16, respectively, so that the lower insulating layer 14 and the upper insulating layer 16 are sandwiched with the lower shield layer 61 and the upper shield layer 51.

The MR device 15, the lower insulating layer 14, the upper insulating layer 16, the lower shield layer 61, and the upper shield layer 51 form a composite 12a, and the composite 12a is formed on the half-core 2. In addition, the layers 14, 16, 61, and 51, and the MR device 15 forming the composite 12a are exposed at an opposing face 6 opposing a recording medium.

On the thin-film magnetic head 12, a writing gap layer 20, a coil layer 21, a coil insulating layer 22, and an upper core layer 23 are sequentially formed, so that the inductive head 10 is formed.

The upper shield layer (shield layer) 51 is composed of an upper rigid layer (rigid layer) 52 formed on the upper insulating layer 16 and an upper magnetic layer (magnetic layer) 53 formed on the upper rigid layer 52.

The upper magnetic layer 53, similar to the upper magnetic layer 43 described in the first embodiment, is formed of a soft magnetic material by plating, is preferably formed of a NiFe alloy, a NiCo alloy, a CoFe alloy, or the like, and more preferably, is formed of a NiFe alloy.

The upper rigid layer 52 is harder than the upper magnetic layer 53, and similar to the rigid base layer 44 described in the first embodiment, is formed of a soft magnetic CoZrNb-based alloy by sputtering.

Since the upper rigid layer 52 which is harder than the upper magnetic layer 53 is disposed between the upper magnetic layer 53 and the upper insulating layer 16, the upper rigid layer 52 is not stretched in the form of a tongue when the opposing face 6 is polished, and hence, short-circuiting thereof with the MR device 15 will not occur.

The thickness $t_1$ of the upper rigid layer 52 is set to be greater than the total thickness of the upper insulating layer 16 and the lower insulating layer 14, i.e., a magnetic gap length G of the thin-film magnetic head 12. That is, the $t_1$ and the G are set so that $t_1 > G$.

As described above, since the thickness $t_1$ of the upper rigid layer 52 is set to be greater than the magnetic gap length G, even if the upper magnetic layer 53 having relatively low hardness is stretched so as to form sags in the form of a tongue when the opposing face 6 is polished, the sags are unlikely to reach the MR device 15, and hence, the short-circuiting between the upper shield layer 51 and the MR device 15 will not occur.

In addition, a soft magnetic CoZrNb-based material forming the upper rigid layer 52 is equivalent to the CoZrNb-based material described in the first embodiment. The CoZrNb-based material has both soft magnetic properties and high hardness, so that the upper shield layer 51 can be formed, which can prevent the short-circuiting caused by sags while having superior shielding properties.

The upper rigid layer 52 described above is a one-layer structure; however, the present invention is not limited thereto. The upper rigid layer 52 may be a two-layer structure composed of a rigid base layer formed of a soft magnetic CoZrNb-based material and a rigid adhesive layer formed by sputtering.

In addition, the upper rigid layer 52 may be formed of the same material as that for the upper magnetic layer 53 by sputtering.

A layer formed by sputtering is a very dense layer and has high hardness. Accordingly, by using a soft magnetic layer formed by sputtering as the upper rigid layer 52, it is possible to make the upper rigid layer 52 have high hardness, and hence, the upper shield layer 51 can be formed, which can prevent short-circuiting caused by sags while having superior shielding properties.

The lower shield layer 61 is composed of a soft magnetic material formed by sputtering and is preferably composed of a NiFe alloy, a NiCo alloy, a CoFe alloy, or the like. In particular, in order to obtain good shielding functions, the lower shield layer 61 is preferably composed of a NiFe alloy.

The thin-film magnetic head 12 is produced in a manner equivalent to the thin-film magnetic head 11 in the first embodiment, other than for the formation of the lower shield layer 61 on the half-core 2 and the formation of the upper shield layer 51 composed of the upper rigid layer 52 and the upper magnetic layer 53 which are sequentially formed on the upper insulating layer 16.

In the thin-film magnetic head 12, since the upper shield layer 51 formed on the upper insulating layer 16 is composed of the upper magnetic layer 53 and the upper rigid layer 52, even when the opposing face 6 is polished, the upper shield layer 51 is not stretched in the form of a tongue due to relatively high hardness of the upper rigid layer 52, and hence, the short-circuiting between the upper rigid layer 52 and the MR device 15 will not occur.

In addition, even if the upper magnetic layer 53 having relatively low hardness is stretched in the form of a tongue when the opposing face 6 is polished, since the upper rigid layer 52 is disposed between the upper magnetic layer 53 and the upper insulating layer 16, sags are unlikely to reach the MR device 15, and hence, the probability of short-circuiting between the upper magnetic layer 53 and the MR device 15 can be decreased.

Third Embodiment

Figure 5:
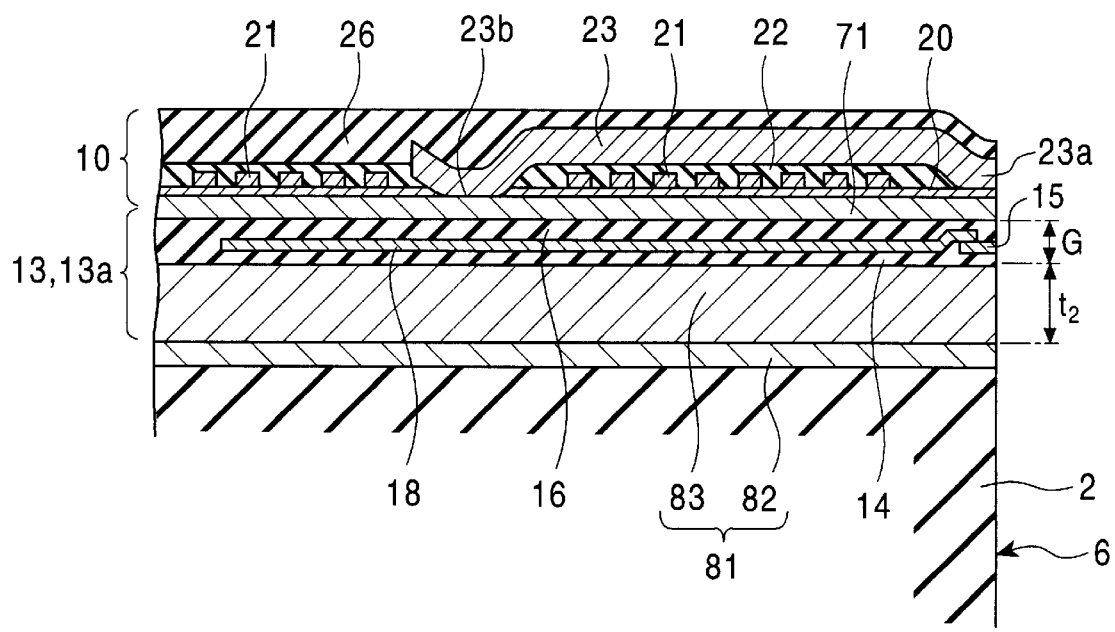
FIG. 5 is a cross-sectional view of a major portion of a thin-film magnetic head according to a third embodiment of the present invention.

Next, the third embodiment of the present invention will be described with reference to the accompanying figures. FIG. 5 is a cross-sectional view of a major portion of a thin-film magnetic head according to the third embodiment of the present invention. Among constituent elements shown in FIG. 5, the same reference numbers of constituent elements shown in FIGS. 1 to 3 designate the same constituent elements in FIG. 5, and descriptions thereof will be omitted or will be simplified.

A thin-film magnetic head 13 according to the third embodiment, similar to the thin-film magnetic head 11 in the first embodiment, is embedded together with an inductive head 10 in an in-core layer 5 and is disposed between half-cores 2 and 3.

The thin-film magnetic head 13 is composed of an MR device 15, a lower insulating layer 14 and an upper insulating layer 16, which are composed of $Al_2O_3$ or the like, are formed on both sides of the MR device 15 in the thickness direction thereof, a lower shield layer (a shield layer) 81 formed on the lower insulating layer 14, and an upper shield layer (a shield layer) 71 formed on the upper insulating layer 16, so that the lower insulating layer 14 and the upper insulating layer 16 are sandwiched with the lower shield layer 81 and the upper shield layer 71.

The MR device 15, the lower insulating layer 14, the upper insulating layer 16, the lower shield layer 81, and the upper shield layer 71 form a composite 13a, and the composite 13a is formed on the half-core 2. In addition, the layers 14, 16, 81, and 71, and the MR device 15 forming the composite 13a are exposed at an opposing face 6 opposing a recording medium.

Furthermore, a writing gap layer 20, a coil layer 21, a coil insulating layer 22, and an upper core layer 23 are sequentially formed on the thin-film magnetic head 13, so that the inductive head 10 is formed.

The lower shield layer (shield layer) 81 is composed of a lower magnetic layer (magnetic layer) 82 formed on the half-core 2 and a lower rigid layer (rigid layer) 83 formed on the lower magnetic layer 82.

The lower magnetic layer 82, similar to the lower magnetic layer 32 described in the first embodiment, is formed of a soft magnetic material by sputtering, is preferably formed of a NiFe alloy, a NiCo alloy, a CoFe alloy, or the like, and more preferably, is formed of a NiFe alloy.

The lower rigid layer 83 which is harder than the lower magnetic layer 82, similar to the lower rigid layer 33 described in the first embodiment, is formed of a soft magnetic CoZrNb-based alloy by sputtering.

Since the lower rigid layer 83 is harder than the lower magnetic layer 82 and is disposed between the lower magnetic layer 82 and the lower insulating layer 14, the lower rigid layer 83 is not stretched in the form of a tongue when the opposing face 6 is polished, and hence short-circuiting with the MR device 15 will not occur.

The thickness $t_2$ of the lower rigid layer 83 is set to be greater than the total thickness of the upper insulating layer 16 and the lower insulating layer 14, i.e., a magnetic gap length G in the thin-film magnetic head 13. That is, the thickness $t_2$ and the magnetic gap length G are set so that $t_2 > G$.

As described above, the thickness of the lower rigid layer 83 is set to be greater than the magnetic gap length G, even if the lower magnetic layer 82 having relatively low hardness is stretched so as to form sags in the form of a tongue when the opposing face 6 is polished, the sags are unlikely to reach the MR device 15, and hence the short-circuiting between the lower shield layer 81 and the MR device 15 will not occur.

A soft magnetic CoZrNb-based material forming the lower rigid layer 83 is a material equivalent to the CoZrNb-based material described in the first embodiment. Since the CoZrNb-based material has both high hardness and soft magnetic properties, the lower shield layer 81 can be formed, which can prevent short-circuiting caused by sags while having superior shielding properties.

In addition, the lower rigid layer 83 described above may be a soft magnetic layer formed of the same material as that for the lower magnetic layer 82 by sputtering.

A layer formed by sputtering is a very dense layer and has high hardness. Accordingly, by using a soft magnetic layer formed by sputtering as the lower rigid layer 83, it is possible to make the lower rigid layer 83 have high hardness, and hence, the lower shield layer 81 can be formed, which can prevent short-circuiting caused by sags while having superior shielding properties.

The upper shield layer 71 is formed of a soft magnetic material by plating and is preferably composed of a NiFe alloy, a NiCo alloy, a CoFe alloy, or the like. In particular, in order to improve the shielding functions, the upper shield layer 71 is preferably formed of a NiFe alloy.

The thin-film magnetic head 13 is produced in a manner equivalent to that for the thin-film magnetic head 11 in the first embodiment, other than for the formation of the lower shield layer 81 composed of the lower magnetic layer 82 and the lower rigid layer 83 sequentially formed on the half-core 2 and the formation of the upper shield layer 71 on the upper insulating layer 16.

In the thin-film magnetic head 13, since the lower shield layer 81 formed on the half-core 2 is composed of the lower magnetic layer 82 and the lower rigid layer 83, even when the opposing face 6 is polished, the lower rigid layer 83 is not stretched in the form of a tongue due to relatively high hardness thereof, and hence, the short-circuiting between the lower rigid layer 83 and the MR device 15 will not occur.

In addition, even if the lower magnetic layer 82 having relatively low hardness is stretched so as to form sags in the form of a tongue when the opposing face 6 is polished, since the lower rigid layer 83 is disposed between the lower magnetic layer 82 and the lower insulating layer 14, the sags are unlikely to reach the MR device 15, land hence, probability of short-circuiting between the lower magnetic layer 82 and the MR device 15 can be decreased.

EXAMPLES

Research on Sagging Formation

Production of Core Block in Example 1

A lower magnetic layer 20,000 Å thick composed of a NiFe alloy, a lower rigid layer 3,000 Å thick composed of $Co_{87}Zr_4Nb_9$ alloy, a lower insulating layer 1,000 Å thick composed of $Al_2O_3$, an MR device, an upper insulating layer 1,000 Å thick composed of $Al_2O_3$, a rigid base layer 2,000 Å thick composed of $Co_{87}Zr_4Nb_9$ alloy, a rigid adhesive layer 1,000 Å thick composed of a NiFe alloy, and an upper magnetic layer 30,000 Å thick composed of a NiFe alloy were sequentially formed on a half-core composed of an $Al_2O_3$-TiC-based ceramic, whereby a thin-film magnetic head similar to that shown in FIG. 1 was produced.

The upper magnetic layer was formed by .plating, and the other layers were formed by sputtering.

Next, a writing gap layer, a coil layer, an upper core layer, and a protective layer were sequentially formed on the thin-film magnetic head, whereby an inductive head similar to that shown in FIG. 1 was produced.

As described above, an in-core layer having the thin-film magnetic head and the inductive head therein was formed.

Subsequently, by integrating the in-core layer with the other half-core, the core block in Example 1 having the in-core layer provided with a pair of half-cores on both sides thereof was produced.

Production of Core Block in Example 2

The core block in Example 2 was produced in a manner similar to that described in Example 1, other than for the formation of a thin-film magnetic head having a structure described below.

Figure 17:
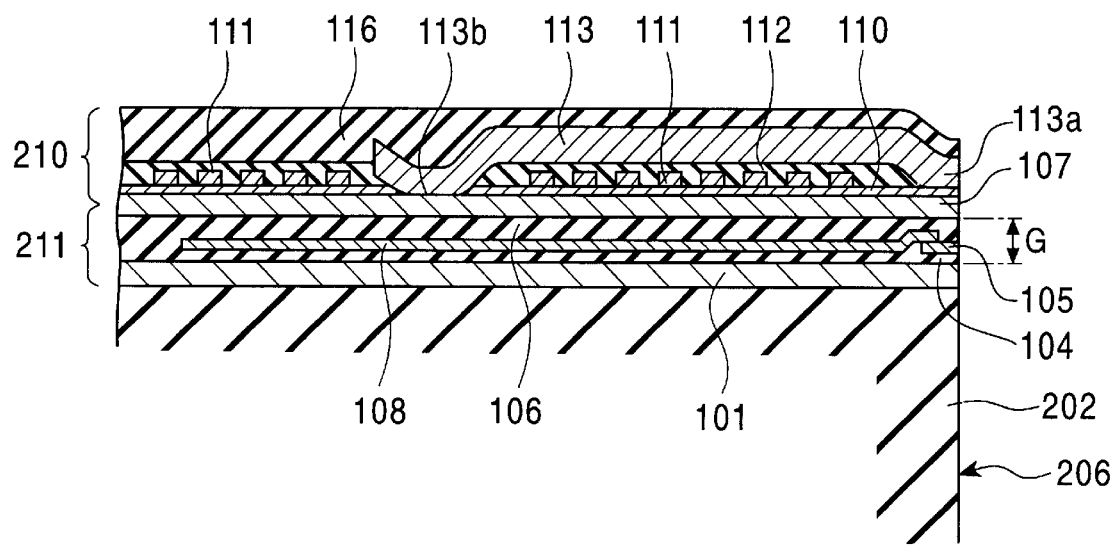
FIG. 17 is a cross-sectional view taken along the line XVII—XVII in FIG. 16.

The thin-film magnetic head provided at the core block in Example 2 had a structure equivalent to that of a thin-film magnetic head shown in FIG. 17, in which a lower shield layer 20,000 Å thick composed of a NiFe alloy, a lower insulating layer 1,000 Å thick composed of $Al_2O_3$, an MR device, an upper insulating layer 1,000 Å thick composed of $Al_2O_3$, and an upper shield layer 30,000 Å thick composed of a NiFe alloy were sequentially formed on a half-core composed of a magnetic material.

The upper shield layer was formed by plating, and the other layers were formed by sputtering.

Short-Circuit Testing

Figure 6:
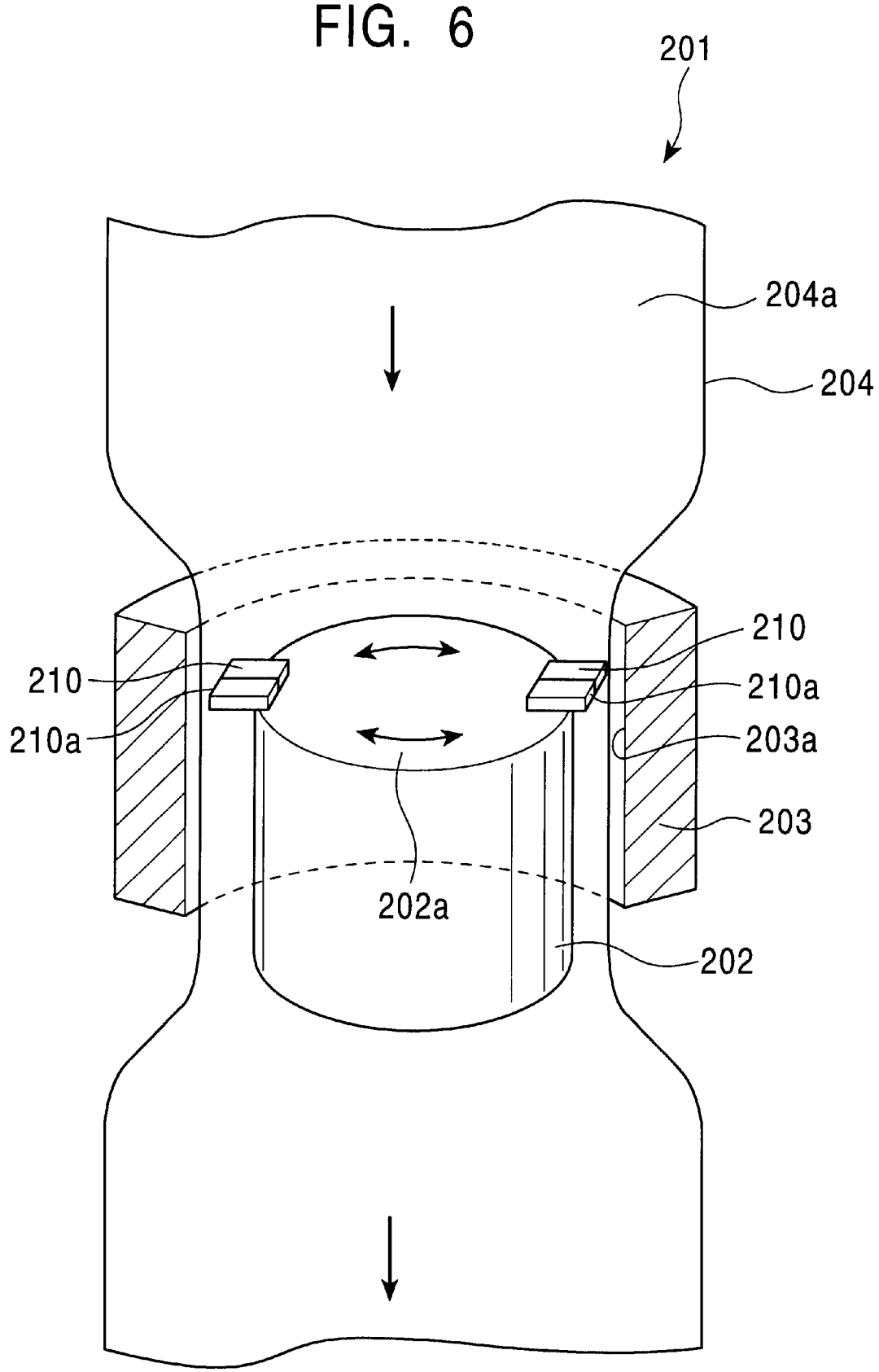
FIG. 6 is a perspective view of a polishing apparatus for forming an opposing face opposing a recording medium by polishing a core block.

The core blocks produced in Examples 1 and 2 were mounted at a polishing apparatus shown in FIG. 6, and one surface of each core block was polished. Next, after each polishing step was performed, whether or not short-circuiting caused by sags occurred was checked by measuring direct current resistance in the MR device provided in the thin-film magnetic head.

A polishing apparatus 201 shown in FIG. 6 was used to form an opposing face, opposing a medium, having a curved convex shape as shown in FIG. 1, by polishing one surface of the block. The polishing apparatus 201 had a rotatable tool 202 connected to a driving device (not shown), a fixing tool 203 having a guide face 203a opposing the circumferential face of the rotatable tool 202, and a polishing tape 204 freely passing between the rotatable tool 202 and the guide face 203a of the fixing tool 203.

On the upper surface 202a of the rotatable tool 202, a core block 210 was fixed so that one surface 210a thereof protruded to the fixing tool 203 side.

A polishing powder composed of diamond was dispersed and carried on a polishing face 204a of the polishing tape 204.

In the polishing apparatus 201, the polishing tape 204 was moved from above to below in the figure while the rotatable tool 202 was alternately rotated in a clockwise direction and a counterclockwise direction in a predetermined rotational range.

In the stage mentioned above, the polishing tape 204 was guided by the guide face 203a so that the polishing face 204a of the polishing tape 204 was formed to have a curved concave face between the rotatable tool 202 and the fixing tool 203. The core block 210 was pressed on the polishing tape 204 having a curved concave face thus formed, and one surface 210a of the block 210 was polished so as to form a curved convex face by the rotation of the rotatable tool 202 and the movement of the polishing tape 204.

Operation of the rotatable tool 202 rotating alternately five times each in the clockwise direction and in the counterclockwise direction for polishing the core block was set to be one step, and the direct current resistance in the MR device of the thin-film magnetic head was measured after each step was performed. The results are shown in FIGS. 7 and 8.

When polishing of the opposing face opposing a recording medium progresses, the direct current resistance in the MR device continuously changes due to a decrease in width (an MR height) in the direction perpendicular to the opposing face of the MR device, and on the other hand, when short-circuiting occurs, the change mentioned above fluctuates since the resistance suddenly decreases when short-circuiting occurs due to sags, and the resistance suddenly increases when sags are removed by polishing. Accordingly, the reason for measuring the direct current resistance in the MR device is that short-circuiting between the shield layer and the MR device caused by the sags can be detected by checking the changes in the direct current resistance.

That is, in thin-film magnetic heads using MR devices, since magnetically written signals on the magnetic recording medium can be read by changes in the resistance in the MR device, the condition of the MR device can be easily determined by measuring the resistance in the MR device with direct current voltage applied thereon while the opposing face of this kind of thin-film magnetic head is processed.

Figure 7:
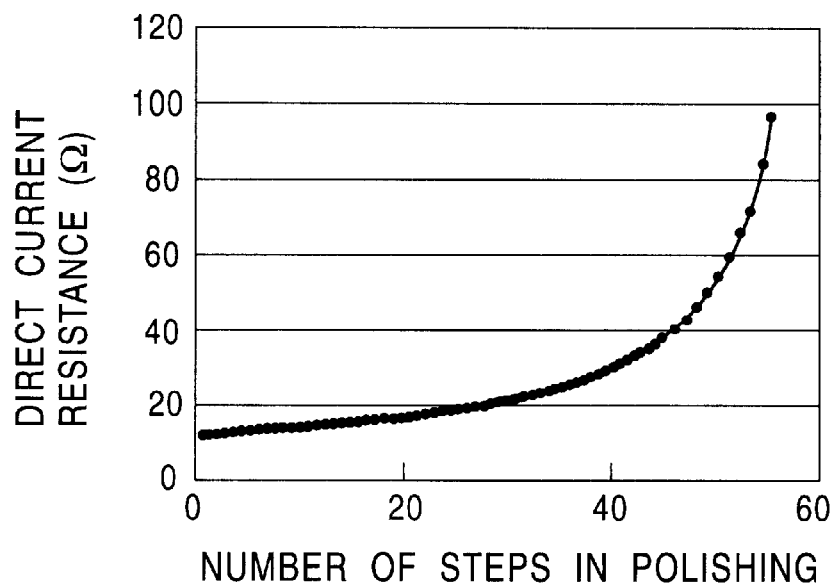
FIG. 7 is a graph showing the relationship between the direct current resistance in an MR device provided on a core block in Example 1 and the number of steps in polishing.
Figure 8:
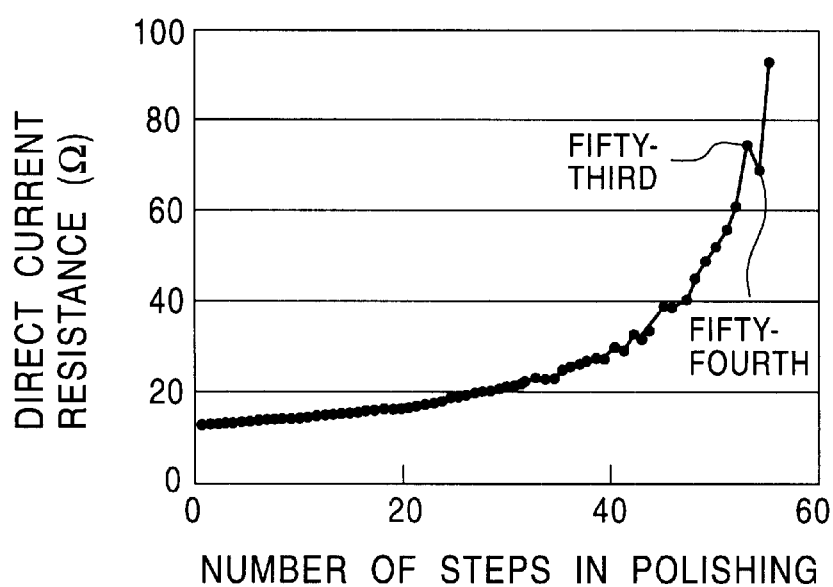
FIG. 8 is a graph showing the relationship between the direct current resistance in an MR device provided on a core block in Example 2 and the number of steps in polishing.

FIG. 7 is a graph showing the relationship between the direct current resistance in the MR device provided in the core block in Example 1 and the number of polishing steps applied thereto, and FIG. 8 is a graph showing the relationship between the direct current resistance in the MR device provided in the core block in Example 2 and the number of polishing steps applied thereto.

As shown in FIG. 7, in the core block in Example 1, the direct current resistance continuously increased concomitant with an increase in the number of polishing steps, and on the other hand, in the core block in Example 2, the direct current resistance thereof decreased between the fifty-third and fifty-fourth polishing step.

The reason for the decrease in the direct current resistance is believed to be that since a rigid layer was not formed in the thin-film magnetic head embedded in the core block in Example 2, at least one of the upper shield layer and the lower shield layer was sagged, and the sags reached the MR device and caused short-circuiting, whereby the direct current resistance decreased due to current leakage from the MR device to the shield layer.

On the other hand, the reason for the continuous increase in the direct current resistance is believed to be that since the lower rigid layer and the rigid base layer were provided in the thin-film magnetic head in the core block in Example 1, short-circuiting between the MR device and the upper and the lower magnetic layer did not occur.

Examination of Properties of CoNbZr Materials

A film 200 to 300 Å thick having a composition represented by the formula $(Co_{87}Nb_9Zr_4)_{100-w}M_w$, in which w is 0 to 12 atomic percent, was formed on a substrate composed of an $Al_2O_3$-TiC-based ceramic by sputtering using a target composed of $Co_{87}Nb_9Zr_4$ alloy and a target composed of a single element M selected from the group consisting of Au, Pd, Cr, Rh, Ru, and Zr.

A DC magnetron is used for sputtering, and the conditions for sputtering were: an applied voltage of 200 to 400 V, an applied current of 1.0 A, and an argon atmosphere of 1.0 to 1.1 mTorr.

Corrosion resistance and magnetic properties were measured for the sputtered films.

Corrosion resistance was measured by the changes in surface roughness and thickness of a sputtered film before and after the film was held for 96 hours in an atmosphere at 80° C. and 90% relative humidity (RH).

Concerning magnetic properties, saturation magnetization, coercive force, and anisotropic magnetic field were measured by a VSM (a vibratory specimen magnetometer) and a BH loop-tracer, and magnetostrictive constants were measured by an optical lever method.

The compositions of the sputtered films were analyzed by a fluorescent X-ray method, and the crystal structures thereof were determined by an X-ray diffraction method.

The results are shown in FIGS. 9 to 14.

Evaluation of Corrosion Resistance

Figure 9:
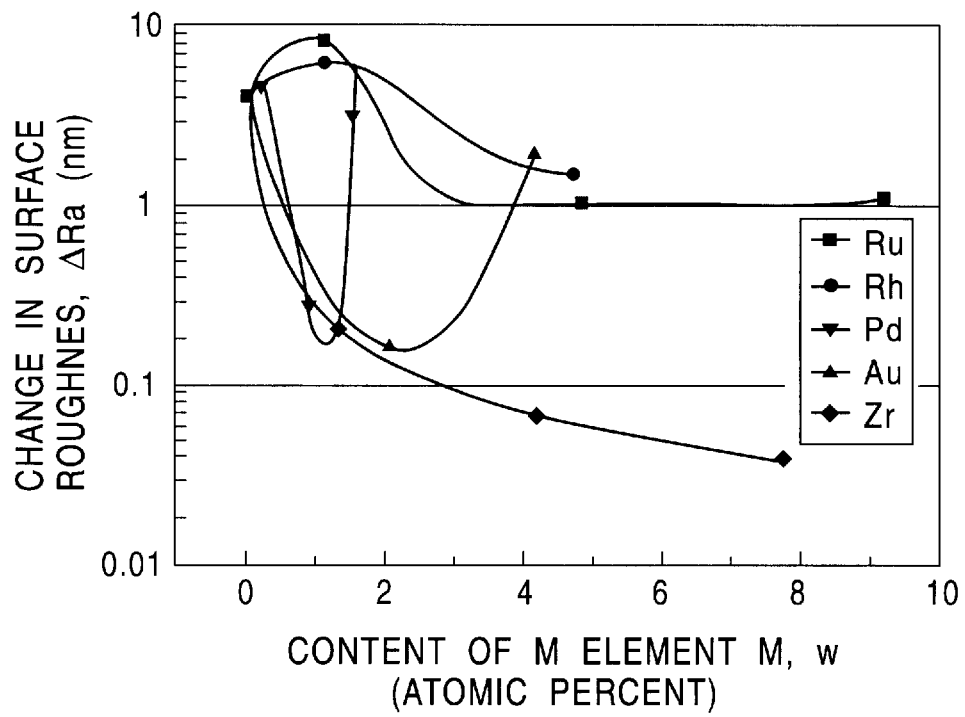
FIG. 9 is a graph showing the relationship between the change in surface roughness ΔRa of a sputtered film and the content of element M.
Figure 10:
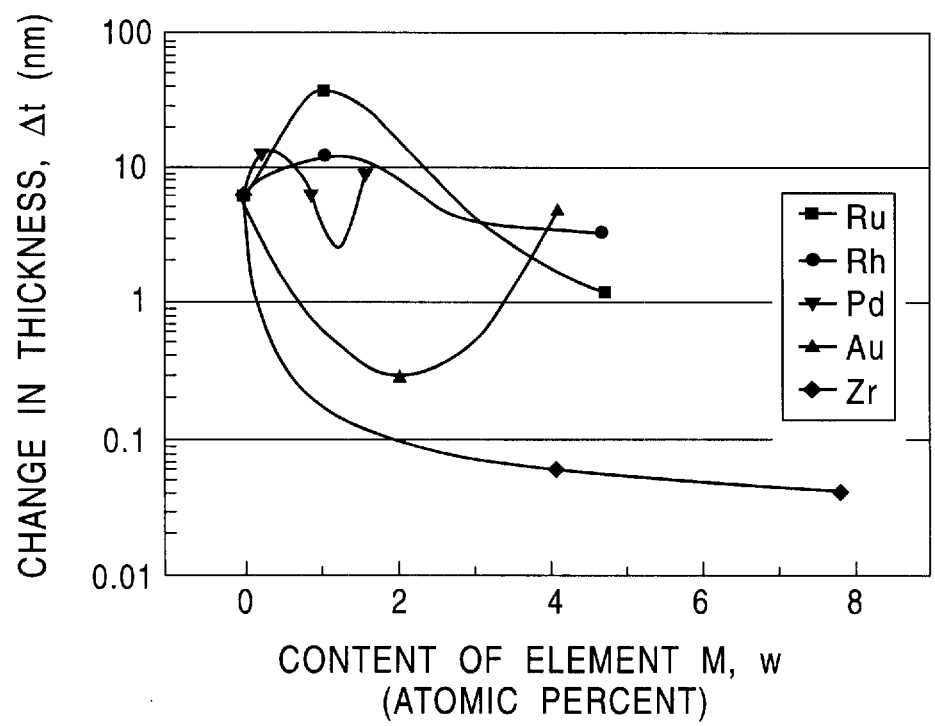
FIG. 10 is a graph showing the relationship between the change in thickness Δt of a sputtered film and the content of element M.

FIG. 9 is a graph showing the relationship between the change ΔRa in surface roughness of a sputtered film and the content of the element M, and FIG. 10 shows the relationship between the change Δt in thickness of a sputtered film and the content of the element M. In this connection, every film obtained by sputtering was determined to be an amorphous film having an amorphous phase as a major phase by the results obtained in the X-ray diffraction measurement.

In FIG. 9, when the element M was not added (w=0 atomic percent), the ΔRa was increased up to 1.4 nm, and on the other hand, when Zr, Au, or Pd was added, a decrease in ΔRa was seen.

When 1 atomic percent of Au was added, the ΔRa showed a minimum value, and when 2 atomic percent of Pd was added, the ΔRa showed a minimum value. In the case of Zr, the ΔRa was gradually decreased until 8 atomic percent thereof.

As can be seen in FIG. 10, when the element M was not added (w=0 atomic percent), the Δt was increased up to 1.6 nm, and on the other hand, when Zr, Au, or Pd was added, the Δt was decreased.

When 1.5 atomic percent of Au was added, the Δt showed a minimum value, and when 2 atomic percent of Pd was added, the Δt showed a minimum value. In the case of Zr, the At was gradually decreased until 8 atomic percent thereof.

As can be seen from the results shown in the figures, Au, Pd, and Zr are superior elements for improving corrosion resistance, and the optimum contents thereof range from 0 to 2 atomic percent of Au, 0 to 4 atomic percent of Pd, and at least 8 atomic percent of Zr.

Evaluation on Magnetic Properties

Figure 11:
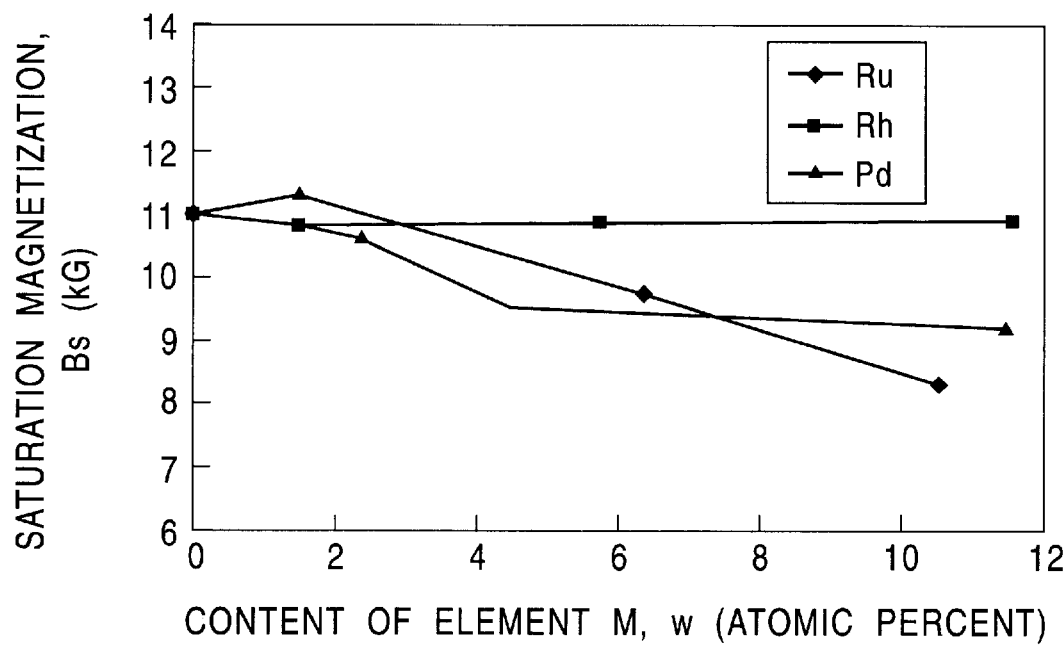
FIG. 11 is a graph showing the relationship between the saturation magnetization Bs of a sputtered film and the content of element M.
Figure 12:
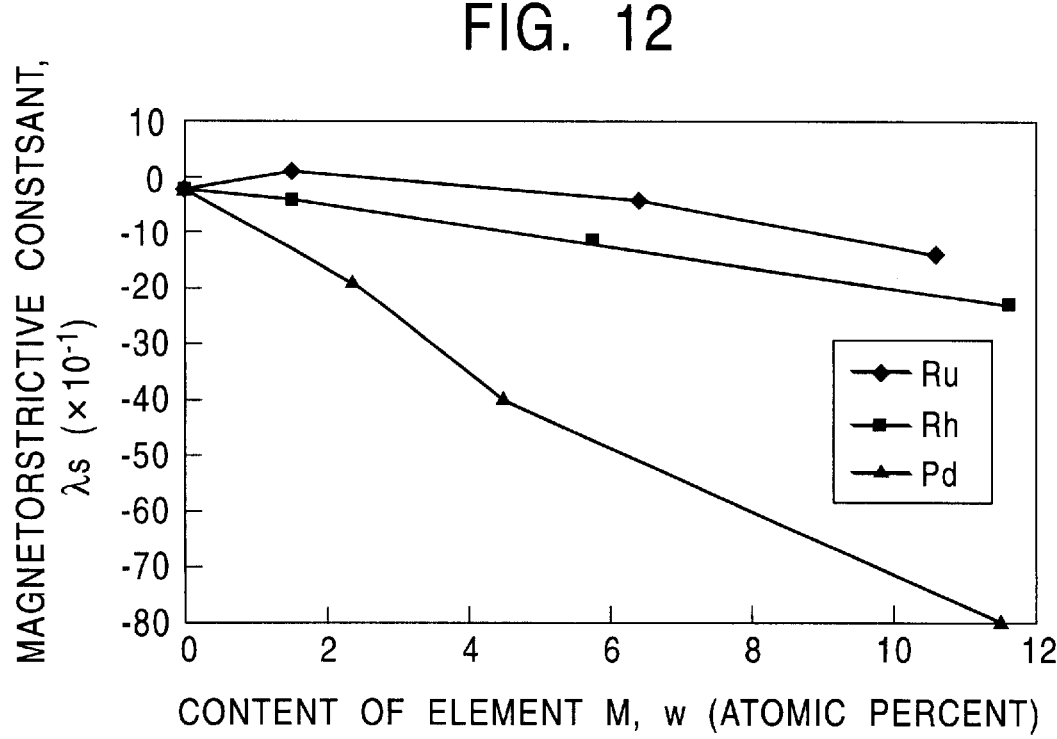
FIG. 12 is a graph showing the relationship between the magnetostrictive constant λs of a sputtered film and the content of element M.
Figure 13:
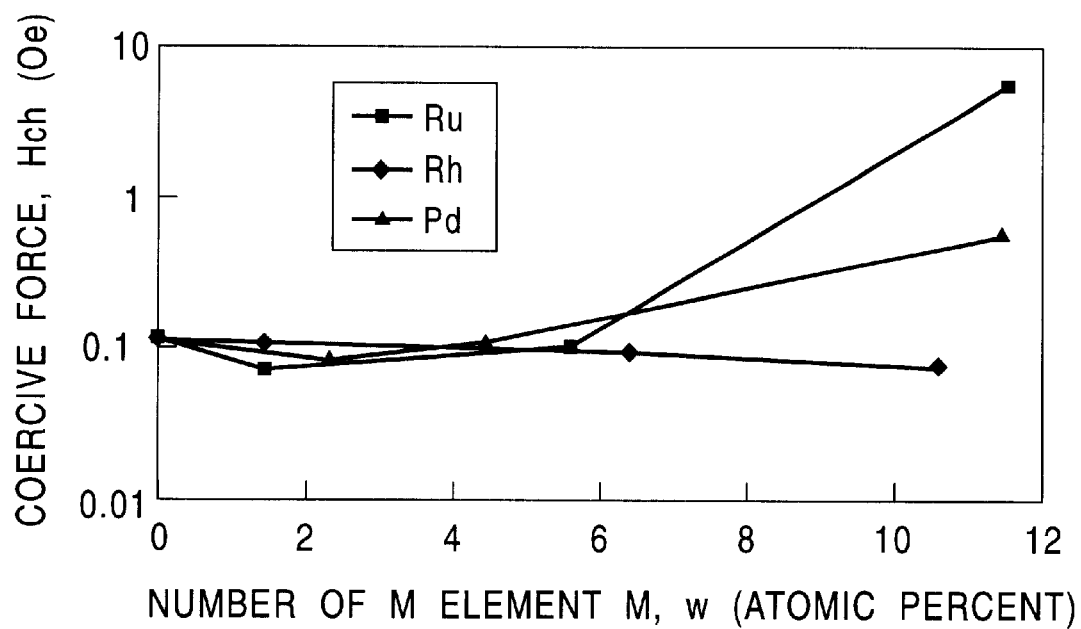
FIG. 13 is a graph showing the relationship between the coercive force Hch of a sputtered film and the content of element M.
Figure 14:
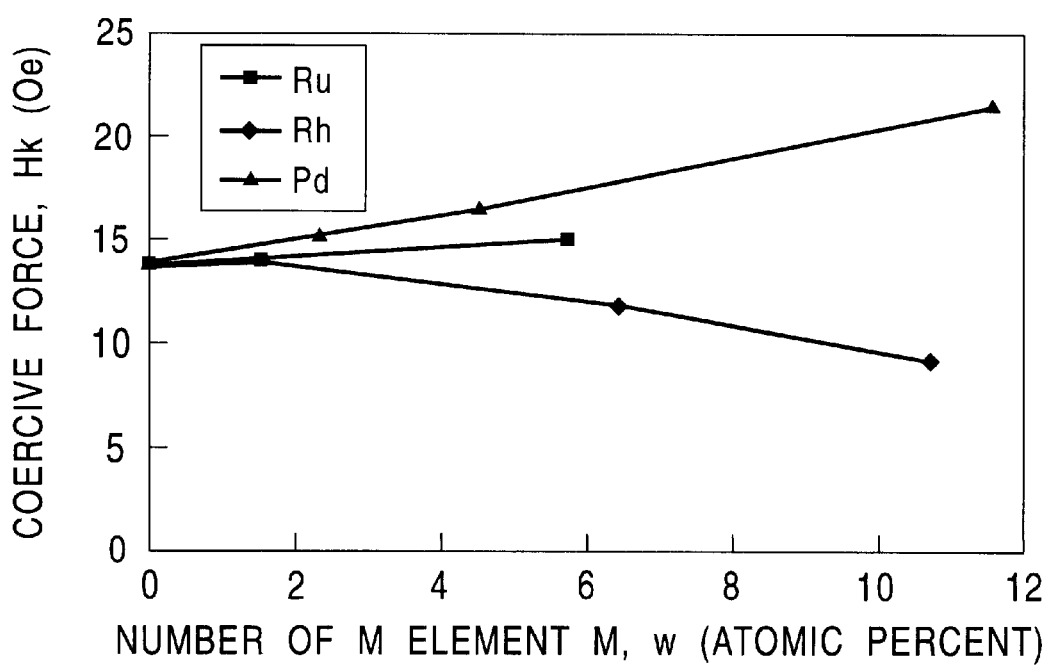
FIG. 14 is a graph showing the relationship between the anisotropic magnetic field Hk of a sputtered film and the content of element M.
Figure 15:
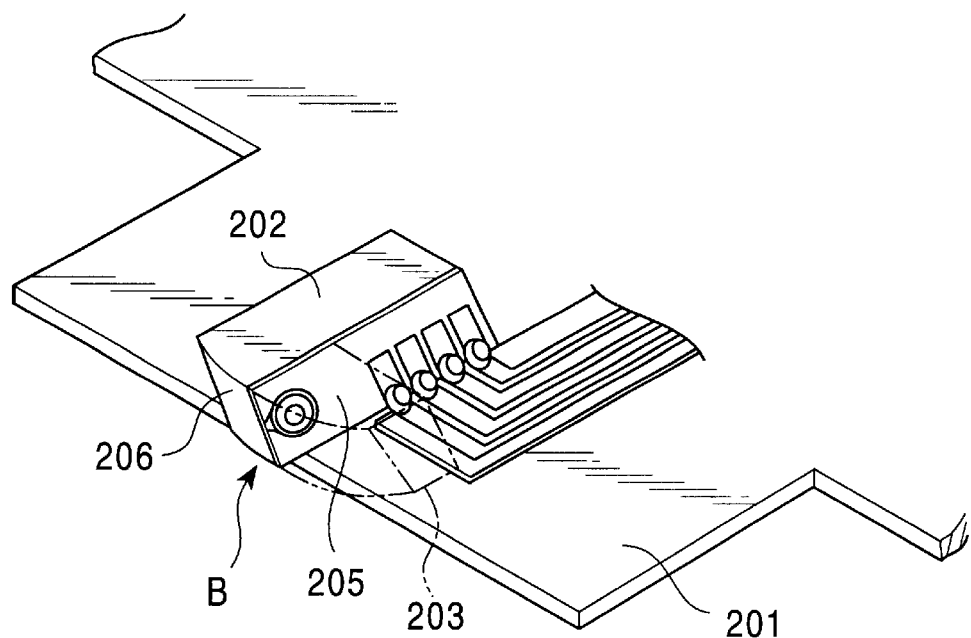
FIG. 15 is perspective view of a sliding-type magnetic head provided with a conventional thin-film magnetic head.
Figure 16:
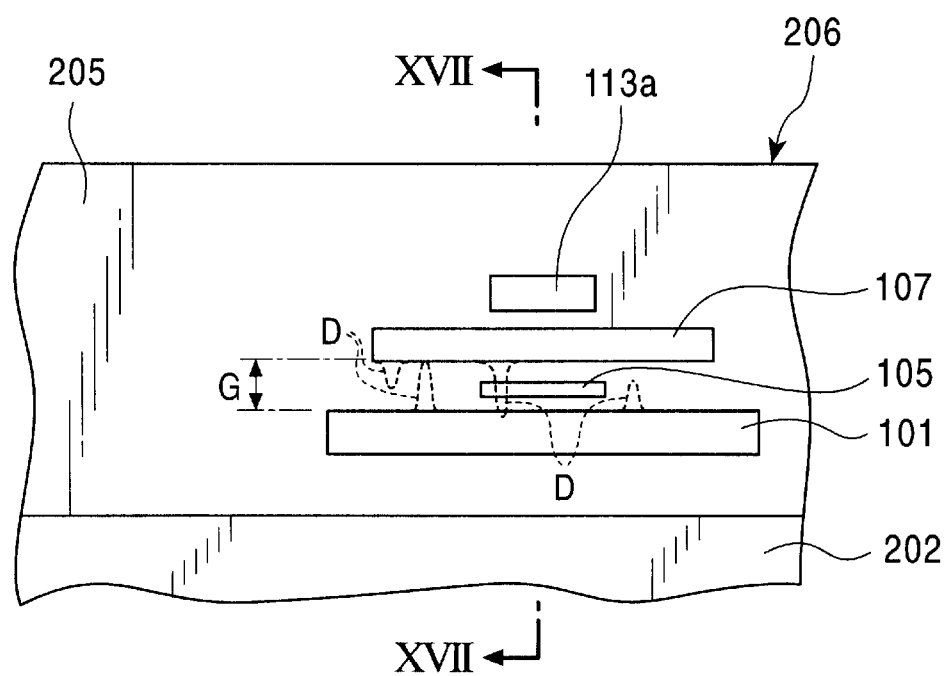
FIG. 16 is a plan view of a major portion of the sliding-type magnetic head in FIG. 15 observed from an opposing face opposing a recording medium.

FIG. 11 is a graph showing the relationship between the saturation magnetization Bs of a sputtered film and the content of the element M, FIG. 12 is a graph showing the relationship between the magnetostrictive constant λs of a sputtered film and the content of the element M, FIG. 13 is a graph showing the relationship between the coercive force Hch of a sputtered film and the content of the element M, and FIG. 14 is a graph showing the relationship between the anisotropic magnetic field Hk of a sputtered film and the content of the element M. In this connection, the coercive force Hch is a coercive force when a magnetic field is applied to the sputtered film in the magnetizing difficult direction.

In addition, from the results obtained from the X-ray diffraction, every sputtered film was an amorphous film having an amorphous phase as a major phase.:

As shown in FIG. 11, when the content of Ru or Pd was increased, the Bs tended to decrease. However, when the content of Rh was increased, the Bs did not significantly change.

As shown in FIG. 12, when the content of Ru, Rh, or Pd was increased, the λs decreased, and in particular, when Pd was added, the λs decreased significantly.

As shown in FIG. 13, even when the content of Ru was increased, the Hch did not change, and when 6 atomic percent or more of Rh or Pd was added, the Hch was increased.

As shown in FIG. 14, even when the content of Rh was increased, the Hk did not change, the Hk was increased when Pd is added, and the Hk decreased when Ru was added.

As described above, when the content of Ru, Rh, or Pd is increased, magnetic properties are influenced to some extent. The content ranges that does not influence magnetic properties are: 2 atomic percent or less of Ru, 6 atomic percent or less of Rh, and 4 atomic percent or less of Pd.

When Pd is added in an amount of 4 atomic percent, the λs decreased significantly; however, since λs can be controlled by the content of Zr as described later, it is believed to be that Pd can be added in an amount of up to 4 atomic percent.

Control of λs by Addition of Zr

In a manner similar to that described above, 10,000 Å-thick films for samples 1 to 16 were formed on $Al_2O_3$-TiC-based ceramic substrates by sputtering.

The saturation magnetization Bs, coercive force Hch and Hce, anisotropic magnetic field Hk, and magnetostrictive constant λs were measured for the sputtered films. The magnetostrictive constant was also measured for some of the sputtered films, which were subjected to heat treatment at 350° C. for 1 hour.

The Hch is a coercive force in the case in which a magnetic field is applied in the magnetizing difficult direction of the sputtered film, and the Hce is a coercive force in the case in which a magnetic field is applied in the magnetizing easy direction of the sputtered film.

Results are shown in Tables 1 and 2.

the two shield layers which sandwich the magnetoresistive device and a pair of insulating layers, is composed of the magnetic layer and the rigid layer, the rigid layer is not stretched in the form of a tongue due to high hardness

TABLE 1

| Sample # | Co (atomic %) | Zr (atomic %) | Nb (atomic %) | Pd (atomic %) | $\lambda s\ (\times 10^{-7})$ as-deposited | annealed | Bs (kG) | Hch (Oe) | Hce (Oe) | Hk (Oe) |
|---|---|---|---|---|---|---|---|---|---|---|
| 1 | 77.02 | 12.30 | 7.13 | 3.55 | −7.33 | — | 6.77 | 0.098 | 0.062 | 11.3 |
| 2 | 78.41 | 12.03 | 7.19 | 2.37 | −2.69 | — | 7.13 | 0.073 | 0.060 | 11.5 |
| 3 | 79.81 | 11.52 | 7.18 | 1.49 | 2.18 | — | 7.24 | 0.068 | 0.064 | 11.3 |
| 4 | 80.63 | 8.91 | 7.30 | 3.16 | −11.79 | — | 8.59 | 0.083 | 0.069 | 14.4 |
| 5 | 81.83 | 8.54 | 7.21 | 2.42 | −6.75 | — | 8.66 | 0.064 | 0.060 | 14.6 |
| 6 | 82.97 | 8.38 | 7.39 | 1.26 | −0.01 | — | 8.84 | 0.076 | 0.067 | 14.0 |
| 7 | 84.04 | 8.23 | 7.39 | 0.34 | 5.51 | — | 9.61 | 0.090 | 0.066 | 13.7 |
| 8 | 83.51 | 6.81 | 7.35 | 2.33 | −9.23 | −3.05 | 9.74 | 0.066 | 0.057 | 12.1 |
| 9 | 84.13 | 6.97 | 7.39 | 1.51 | −3.76 | 2.42 | 9.49 | 0.071 | 0.070 | 14.9 |
| 10 | 85.00 | 6.94 | 7.25 | 0.81 | 1.28 | — | 9.50 | 0.054 | 0.054 | 14.0 |
| 11 | 85.43 | 6.85 | 7.36 | 0.36 | 2.99 | — | 9.70 | 0.079 | 0.062 | 14.1 |

TABLE 2

| Sample # | Co (atomic %) | Zr (atomic %) | Nb (atomic %) | Au (atomic %) | $\lambda s\ (\times 10^{-7})$ as-deposited | annealed | Bs (kG) | Hch (Oe) | Hce (Oe) | Hk (Oe) |
|---|---|---|---|---|---|---|---|---|---|---|
| 12 | 84.09 | 7.41 | 7.56 | 0.94 | 0.62 | — | 8.81 | 0.006 | 0.057 | 12.1 |
| 13 | 82.77 | 7.68 | 7.77 | 1.78 | −4.39 | — | 8.60 | 0.069 | 0.054 | 12.9 |
| 14 | 85.67 | 5.82 | 7.64 | 0.87 | −4.20 | 2.51 | 10.01 | 0.058 | 0.050 | 13.9 |
| 15 | 83.76 | 5.93 | 8.77 | 1.54 | −9.96 | −2.79 | 9.70 | 0.070 | 0.060 | 14.1 |
| 16 | 88.90 | 3.87 | 7.23 | 0.00 | 0.22 | −0.40 | 11.14 | 0.050 | 0.053 | 14.2 |

As can be seen in Tables 1 and 2, when Zr was added in an amount of approximately 6.8 to 12% atomic percent, even if Pd was added in an amount of 3 atomic percent or more, the $\lambda s$ can be $-12 \times 10^{-7}$ or more.

On the other hand, in FIG. 12, the content of Zr was 4 atomic percent or less, and in order to make $\lambda s$ $-12 \times 10^{-7}$ or more, the content of Pd must be 2 atomic percent or less.

Accordingly, when Zr and Pd are added, and the content of Zr is set to be in an appropriate range, the corrosion resistance can be improved by increasing the content of Pd, and hence, a CoNbZr-based material having superior corrosion resistance and magnetic properties can be obtained.

In addition, as shown in Table 2, in the case in which Au is added instead of Pd, even when Au is added in an amount of approximately 1.7 atomic percent, $\lambda s$ can be $-10 \times 10^{-7}$ or more by setting the content of Zr to be approximately 3.8 to 7.6% atomic percent.

The technical aspects of the present invention are not limited to the embodiments described above, and it is to be understood that changes and variation may be made without departing from the spirit or the scope of the present invention. For example, the MR head 15 provided at the thin-film magnetic head 11, 12, or 13 of the present invention may be a spin valve type thin-film magnetic head having a giant magnetoresistance.

In addition, in the embodiments of the present invention, the thin-film magnetic head of the, present invention suitable for a sliding-type magnetic head is described by way of example; however, the present invention is not limited thereto and may be applied to a floating-type magnetic head operating without contacting with a recording medium.

As has thus been described, according to the thin-film magnetic head of the present invention, since at least one of thereof even when the opposing face opposing a recording medium is polished, and hence, the short-circuiting between the magnetoresistive device and the rigid layer will not occur.

Even when one magnetic layer having relatively low hardness is stretched so as to form sags in the form of a tongue when the opposing face is polished, since the rigid layer is disposed between the magnetic layer and the insulating layer, the sags are unlikely to reach the magnetoresistive device or the other magnetic layer (the other shield layer), the probability of short-circuiting between the magnetoresistive device and the shield layer can be decreased.

According to the thin-film magnetic head of the present invention, since the rigid layer is composed of a soft magnetic CoZrNb-based material, the rigid layer has both high hardness and a soft magnetic properties, and hence, a shield layer can be formed which can prevent the formation of sags while having superior shielding properties.

According to the thin-film magnetic head of the present invention, since a soft magnetic layer formed by sputtering is used as the rigid layer, a rigid layer having high hardness can be obtained, and a shield layer can be formed which can prevent short-circuiting caused by sags while having superior shielding properties.

In addition, according to the thin-film magnetic head of the present invention, since the rigid base layer is formed on the insulating layer, and the rigid adhesive layer composed of the same material as that for the magnetic layer is formed between the rigid base layer and the magnetic layer by sputtering, the separation between the rigid base layer and the magnetic layer can be prevented by the rigid adhesive layer.

Furthermore, according to the thin-film magnetic head of the present invention, the thickness of the rigid layer is set to be greater than the distance between the shield layers, so that the thickness of the rigid layer is greater than the magnetic gap length of the thin-film magnetic head. Accordingly, the distances between the magnetoresistive device and individual magnetic layers can be sufficiently large, so that the probability of short-circuiting between the shield layer and the magnetoresistive device can be decreased even when sags occur in the magnetic layer.

What is claimed is:

1. A thin-film magnetic head comprising:
a laminate comprising a magnetoresistive device for reading information by moving relative to a magnetic recording medium, insulating layers provided on both sides of the magnetoresistive device in the thickness direction thereof, and shield layers provided on each insulating layer; and a substrate on which the laminate is provided; in which the magnetoresistive device, the insulating layers, and the shield layers are exposed at an opposing face opposing a recording medium,
wherein at least one of the shield layers in contact with the insulating layers comprises a magnetic layer and a rigid layer harder than the magnetic layer and in contact with the insulating layer, and
wherein the thickness of the rigid layer is greater than the distance between the shield layers.

2. A thin-film magnetic head according to claim 1, wherein at least one rigid layer comprises a soft magnetic CoZrNb-based material.

3. A thin-film magnetic head according to claim 1, wherein the CoZrNb-based material is represented by the formula $Co_xZr_yNb_z$, in which the x, y, and z, representing the composition ratios on an atomic percent basis, are $78\% \leq x \leq 92\%$, $y=a(100-x)\%$, and $z=(100-x-y)\%$, and the a is $0.1 \leq a \leq 0.5$.

4. A thin-film magnetic head according to claim 1, wherein the CoZrNb-based material is represented by the formula $Co_xZr_yNb_zT_v$, in which the T is at least one element selected from the group consisting of Au, Pd, Cr, Rh, and Ru, the x, y, z, and v, representing the composition ratios on an atomic percent basis, are $78\% \leq x \leq 92\%$, $y=a(100-x)\%$, $0\% \leq v \leq 4\%$, and $z=(100-x-y-v)\%$, and the a is $0.1 \leq a \leq 0.5$.

5. A thin-film magnetic head according to claim 1, wherein the magnetic recording medium is a magnetic tape, and the magnetic tape slides over the opposing face.

6. A thin-film magnetic head comprising:
a laminate comprising a magnetoresistive device for reading information by moving relative to a magnetic recording medium, insulating layers provided on both sides of the magnetoresistive device in the thickness direction thereof, and shield layers provided on each insulating layer; and a substrate on which the laminate is provided; in which the magnetoresistive device, the insulating layers, and the shield layers are exposed at an opposing face opposing a recording medium,
wherein at least one of the shield layers in contact with the insulating layers comprises a magnetic layer and a rigid layer harder than the magnetic layer and in contact with the insulating layer,
wherein at least one of the rigid layers is a soft magnetic layer formed by sputtering, and
wherein the thickness of the rigid layer is greater than the distance between the shield layers.

7. A thin-film magnetic head according to claim 6, wherein the CoZrNb-based material is represented by the formula $Co_xZr_yNb_z$, in which the x, y, and z, representing the composition ratios on an atomic percent basis, are $78\% \leq x \leq 92\%$, $y=a(100-x)\%$, and $z=(100-x-y)\%$, and the a is $0.1 \leq a \leq 0.5$.

8. A thin-film magnetic head according to claim 6, wherein the CoZrNb-based material is represented by the formula $Co_xZr_yNb_zT_v$, in which the T is at least one element selected from the group consisting of Au, Pd, Cr, Rh, and Ru, the x, y, z, and v, representing the composition ratios on an atomic percent basis, are $78\% \leq x \leq 92\%$, $y=a(100-x)\%$, $0\% \leq v \leq 4\%$, and $z=(100-x-y-v)\%$, and the a is $0.1 \leq a \leq 0.5$.

9. A thin-film magnetic head according to claim 6, wherein the magnetic recording medium is a magnetic tape, and the magnetic tape slides over the opposing face.

10. A thin-film magnetic head comprising:
a laminate comprising a magnetoresistive device for reading information by moving relative to a magnetic recording medium, insulating layers provided on both sides of the magnetoresistive device in the thickness direction thereof, and shield layers provided on each insulating layer; and a substrate on which the laminate is provided; in which the magnetoresistive device, the insulating layers, and the shield layers are exposed at an opposing face opposing a recording medium,
wherein at least one of the shield layers in contact with the insulating layers comprises a magnetic layer and a rigid layer harder than the magnetic layer and in contact with the insulating layer,
wherein the rigid layer disposed more distant from the substrate than the magnetoresistive device comprises a rigid base layer composed of a soft magnetic CoZrNb-based material in contact with the insulating layer and a rigid adhesive layer formed of the same material as that for the magnetic layer by sputtering and in contact therewith, and
wherein the thickness of the rigid layer is greater than the distance between the shield layers.

11. A thin-film magnetic head according to claim 10, wherein the CoZrNb-based material is represented by the formula $Co_xZr_yNb_z$, in which the x, y, and z, representing the composition ratios on an atomic percent basis, are $78\% \leq x \leq 92\%$, $y=a(100-x)\%$, and $z=(100-x-y)\%$, and the a is $0.1 \leq a \leq 0.5$.

12. A thin-film magnetic head according to claim 10, wherein the CoZrNb-based material is represented by the formula $Co_xZr_yNb_zT_v$, in which the T is at least one element selected from the group consisting of Au, Pd, Cr, Rh, and Ru, the x, y, z, and v, representing the composition ratios on an atomic percent basis, are $78\% \leq x \leq 92\%$, $y=a(100-x)\%$, $0\% \leq v \leq 4\%$, and $z=(100-x-y-v)\%$, and the a is $0.1 \leq a \leq 0.5$.

13. A thin-film magnetic head according to claim 10, wherein the magnetic recording medium is a magnetic tape, and the magnetic tape slides over the opposing face.

* * * * *